United States Patent
Goh et al.

(10) Patent No.: US 7,160,513 B2
(45) Date of Patent: Jan. 9, 2007

(54) BATCH REACTOR WITH INJECTION SYSTEM

(75) Inventors: Christopher Goh, San Francisco, CA (US); Keith Anthony Hall, San Jose, CA (US); Thomas R. Boussie, Menlo Park, CA (US); Vince Murphy, San Jose, CA (US); Trevor G. Frank, Fremont, CA (US); William H. Chandler, Jr., Milpitas, CA (US); Lynn Van Erden, Livermore, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 617 days.

(21) Appl. No.: 10/325,709

(22) Filed: Dec. 20, 2002

(65) Prior Publication Data

US 2004/0121448 A1 Jun. 24, 2004

(51) Int. Cl.
*B01L 3/02* (2006.01)
(52) U.S. Cl. .................... 422/100; 422/65; 422/130
(58) Field of Classification Search .............. 422/130, 422/65, 100
See application file for complete search history.

(56) References Cited

U.S. PATENT DOCUMENTS

| | | | |
|---|---|---|---|
| 5,593,642 A | 1/1997 | DeWitt et al. | 422/131 |
| 5,776,359 A | 7/1998 | Schultz et al. | 252/62.51 |
| 5,900,215 A * | 5/1999 | Seifert et al. | 422/82.07 |
| 5,900,557 A * | 5/1999 | Tanihata et al. | 73/863.01 |
| 5,959,297 A * | 9/1999 | Weinberg et al. | 250/288 |
| 5,985,356 A | 11/1999 | Schultz et al. | 427/8 |
| 6,004,617 A | 12/1999 | Schultz et al. | 427/8 |
| 6,013,199 A | 1/2000 | McFarland et al. | 252/301.4 |
| 6,030,917 A | 2/2000 | Weinberg et al. | 502/104 |
| 6,034,240 A | 3/2000 | La Pointe | 546/24 |
| 6,034,775 A | 3/2000 | McFarland et al. | 356/364 |
| 6,043,363 A | 3/2000 | LaPointe et al. | 544/225 |
| 6,045,671 A | 4/2000 | Wu et al. | 204/298.11 |
| 6,063,633 A | 5/2000 | Willson, III | 436/37 |
| 6,087,181 A | 7/2000 | Cong | 436/37 |
| 6,124,476 A | 9/2000 | Guram et al. | 549/200 |
| 6,149,882 A | 11/2000 | Guan et al. | 422/211 |
| 6,151,123 A | 11/2000 | Nielsen | 356/445 |
| 6,157,449 A | 12/2000 | Hajduk | 356/367 |
| 6,175,409 B1 | 1/2001 | Nielsen et al. | 356/337 |
| 6,177,528 B1 | 1/2001 | LaPointe et al. | 526/139 |
| 6,182,499 B1 | 2/2001 | McFarland et al. | 72/24.06 |
| 6,187,164 B1 | 2/2001 | Warren et al. | 205/81 |

(Continued)

FOREIGN PATENT DOCUMENTS

EP 1167967 1/2002

(Continued)

OTHER PUBLICATIONS

D.F. Shriver et al., "The Manipulation of Air-Sensitive Compounds", Second Edition, John Wiley & Sons, Canada 1986.

(Continued)

*Primary Examiner*—Jill Warden
*Assistant Examiner*—Natalia Levkovich

(57) ABSTRACT

An apparatus and method for injection of one or more chemical components into a reaction chamber are disclosed. The apparatus includes a reaction chamber for receiving one or more libraries in a fixed position relative to the chamber and configured to form a sealed enclosure. An injection manifold is located within the reaction chamber and selectively movable relative to the libraries. The injection manifold is configured for receiving at least one fluid transfer line coupled to an external source for injection of one or more chemical components into the reaction chamber.

50 Claims, 17 Drawing Sheets

U.S. PATENT DOCUMENTS

| | | | |
|---|---|---|---|
| 6,203,726 B1 | 3/2001 | Danielson et al. | 252/301.4 |
| 6,225,487 B1 | 5/2001 | Guram | 556/18 |
| 6,225,550 B1 | 5/2001 | Hornbostel et al. | 136/236.1 |
| 6,242,623 B1 | 6/2001 | Boussie et al. | 556/18 |
| 6,248,540 B1 | 6/2001 | Weinberg et al. | 435/7.1 |
| 6,255,487 B1 | 7/2001 | Duchene et al. | 544/396 |
| 6,255,550 B1 | 7/2001 | Huffman | 585/638 |
| 6,260,407 B1 | 7/2001 | Petro et al. | 73/61.52 |
| 6,265,226 B1 | 7/2001 | Petro et al. | 436/180 |
| 6,265,601 B1 | 7/2001 | Guram et al. | 558/411 |
| 6,268,513 B1 | 7/2001 | Guram et al. | 549/200 |
| 6,294,388 B1 | 9/2001 | Petro | 436/8 |
| 6,306,658 B1 | 10/2001 | Turner et al. | 436/37 |
| 6,789,578 B1 * | 9/2004 | Latham et al. | 138/89 |
| 2001/0034067 A1 * | 10/2001 | Dales et al. | 436/180 |
| 2002/0085945 A1 * | 7/2002 | Florkey et al. | 422/3 |

FOREIGN PATENT DOCUMENTS

| | | |
|---|---|---|
| EP | 1258286 | 11/2002 |
| WO | WO97/32208 | 9/1997 |
| WO | WO97/35171 | 9/1997 |
| WO | WO98/15813 | 4/1998 |
| WO | WO00/09255 | 2/2000 |
| WO | WO00/32308 | 6/2000 |
| WO | WO00/40331 | 7/2000 |
| WO | WO 0102089 | 1/2001 |
| WO | WO01/93998 | 12/2001 |
| WO | WO 02066151 | 8/2002 |

OTHER PUBLICATIONS

D.D. Perrin et al., "Purification of Laboratory Chemicals", England 1988. Third Edition, Pergamon Press.

Carmona, Ernesto et al., Synthesis and Properties of Dialkyl Complexes of Nickel (II). The Crystal Structure of Bis(pyridine)bis(trimethylsilylmethyl)nickel(II), J.C.S. Dalton, pp. 777-782.

Johnson, Lynda K., "New Pd(II) and Ni(II)-Based Catalysts for Polymerization of Ethylene and α-Olefins", American Chemical Society, pp. 6414-6415.

Pangborn et al., "Safe and Convenient Procedure for Solvent Purification", Organometallics 1996, pp. 1518-1520.

* cited by examiner

BATCH REACTOR WITH INJECTION SYSTEM

FIELD OF THE INVENTION

The present invention relates to an apparatus and method for screening two or more samples under controlled environmental conditions. More particularly, the present invention relates to an apparatus and method for permitting the screening of two or more material samples under controlled temperature and pressure, wherein one or more chemical components may be injected into the screening apparatus at ambient conditions or under pressure at any point during the screening.

BACKGROUND OF THE INVENTION

The application of combinatorial methodologies to the discovery of new materials such as polymers continues to receive considerable attention in academia and industry because it has the potential to increase greatly the rate of discovery over conventional discovery methods. For the discovery of new materials, such methodologies have great utility in the field of homogeneous catalysis, which often employs organometallic catalysts. U.S. Pat. No. 6,030,917, incorporated herein by reference, owned by the Assignee of the present application and entitled Combinatorial Synthesis and Analysis of Organometallic Compounds and Catalysts, issued February 2000 to Weinberg et al., discusses general combinatorial methods for preparing organometallic compounds such as catalysts. Organometallic compounds and catalysts may be generated by the reaction of metal precursors with ligands. PCT Application No. PCT/US00/00418, incorporated herein by reference, published July 2000 and owned by the Assignee of the present invention, discusses library formats for ligand arrays that may be used in the application of combinatorial methodologies. Typically, active catalysts are then generated by treatment of said organometallic compounds and catalysts with chemical components such as suitable activators and/or scavengers. Often, it is preferable to generate active catalysts in the presence of at least one of the monomers, and even more preferably all the monomers, to be polymerized, and under conditions where parameters such as monomer concentrations, reactant ratios, partial pressures of gases and temperature are carefully controlled. Without careful control over such experimental parameters the performance of the catalyst and the nature of the product may be adversely affected. For example, catalysts may decompose more readily in the absence of the monomer(s) to be polymerized. Generation of an active catalyst is generally preferably done under pressure and temperature equilibrated conditions, and is especially important and challenging for polymerization involving the use of gaseous monomers such as ethylene, propylene, vinyl chloride and isobutylene.

A typical primary screening workflow that utilizes combinatorial methodologies for the discovery of new catalysts such as homogeneous catalysts that may polymerize olefinic monomers involves the screening of large arrays of potential catalysts for their activity and ability to produce polymers or copolymers with desired polymer properties such as molecular weight distribution, comonomer content, sequence distribution, melting point, mechanical and rheological properties and the like. The most promising catalysts as judged by, for example, their activity and the molecular weight distribution of the polymers they produce may be screened later under more carefully controlled conditions to further probe or ascertain polymer properties, composition, or structure.

Often, there is a need for conducting primary screening experiments at elevated temperatures and pressures, and for carrying out post-reaction characterization of the products. Precise control of variables such as temperature, agitation, pressure, and timing and sequence of addition of reagents is often needed. Without careful control screening results may be compromised by uncertainties in the contributions from these experimental factors.

Conventional primary screening reactor designs do not typically allow for the addition of reagents such as scavengers and activators at a desired reaction temperature or in the presence of pressure-equilibrated gaseous monomers. For example, arrays of catalyst precursors are often activated at room temperature and are rapidly transferred to a heater where the reaction vials within the array gradually reach the desired screening temperature. The time required to reach the screening temperature introduces an ambiguity with respect to the temperature at which the polymerization actually occurs. The performance of catalysts is expected to be dependent on temperature. For example, some catalysts may be active at room temperature yet are less active or decompose at higher temperatures. These catalysts may appear as false positives in primary screening experiments using past methodologies involving a temperature ramp during the polymerization, and may lead to unnecessary follow-up studies. Properties of the polymer product produced are also expected to be strongly dependent on temperature. As a consequence, rating the capability of catalysts to produce certain products as a function of temperature may be difficult without the capability of activating catalysts at the reaction temperature and at set monomer pressures.

The inability to activate catalyst precursors under pressure equilibrated conditions in past primary screening processes may also lead to false negatives. For example, catalysts are typically activated at room temperature either in the presence of a small amount of solubilized monomer or in the absence of monomer. These small amounts of monomer may not be able to stabilize very active catalysts to the degree that would be achieved if all the desired monomer were present. Without this stabilization by monomer, these catalysts may degrade.

In another conventional primary screening process, a high pressure reactor containing arrays of catalyst precursors is pre-pressurized with the target monomer mixture in order to allow the monomer to dissolve into the wells of the array. The reaction chamber is depressurized to allow the library to be removed so that, for example, activators may be added, resulting in the outgassing of gaseous monomers from the solutions in the wells of the array. As a result, the gaseous monomers are no longer present at the same concentration that they were when under pressure, leading to uncertainties about the amount and ratio of gasses dissolved. For polymerization reactions involving more than one olefinic monomer, this may mean that the monomer ratios are different at the time of activation. This event creates a less than ideal situation because the monomer ratio and concentration may be critical to catalyst performance as well as polymer composition, property and structure. For example, in a vinyl chloride-ethylene mixture, outgassing of the more volatile ethylene may lead to undesirably high vinyl chloride concentrations, possibly causing catalyst degradation.

Another drawback to traditional primary screening reactors is their limited stirring capabilities that results from the use of conventional rotary stirring. Reactors currently used in primary screening are typically placed on top of conventional magnetic stir plates, which are used to move stir bar elements located in individual wells. However, the rates of stirring may depend strongly on the location of the wells relative to the center of the stir plate, which can have a dramatic affect on the ability of gaseous reagents to diffuse into reaction mixtures within the wells. This may lead to inhomogeneous diffusion rates for gaseous monomers such as ethylene from well to well within a library, resulting in ambiguities in data obtained for diffusion-limited reactions.

For the aforementioned reasons, it is desirable to activate the catalyst precursor libraries once pressure and temperature equilibration have been reached. Additionally, it is desirable to provide homogenous stirring to libraries while being screened in such high throughput reactors.

SUMMARY OF THE INVENTION

An apparatus and method for injection of one or more chemical components into a reaction chamber are disclosed. The apparatus includes a reaction chamber for receiving one or more libraries in a fixed position relative to the chamber and configured to form a sealed enclosure. An injection manifold is located within the reaction chamber and selectively movable relative to the libraries. The injection manifold is configured for receiving at least one fluid transfer line coupled to an external source for injection of one or more chemical components into the reaction chamber.

The apparatus may further include a stirring system for agitating the samples and a heating system. An inlet is preferably provided for introducing a charging agent into the sealed reaction chamber. The reaction chamber may be configured, for example, to sustain a pressure of 5 psi, 60 psi, or 200 psi, or a vacuum.

In one embodiment, a motor drive system is provided to impart motion of the injection manifold relative to the samples. A magnet and sensor may be used to identify a home position of the injection manifold so that the manifold can be positioned relative to its home position.

The reaction chamber may be formed from a cylindrical housing and a door which is movable between an open position, closed position, and safety position in which the pressurized reaction chamber is vented to slowly release pressure.

In another aspect of the invention, an apparatus for injection of one or more chemical components into a reaction chamber generally comprises a reaction chamber for receiving one or more libraries and configured to form a sealed enclosure operable to withstand a pressure of approximately 60 psi. Each of the libraries comprises two or more samples. The apparatus further includes an injection manifold configured for receiving at least one fluid transfer line coupled to an external source for injection of one or more chemical components onto one or more of the samples with the reaction chamber pressurized. The injection manifold is movably mounted within the reaction chamber to position the fluid transfer line for injection of the chemical component onto a selected sample.

A method for injection of one or more chemical components into a reaction chamber generally comprises inserting one or more libraries into a reaction chamber in a fixed position relative to the reaction chamber and sealing the reaction chamber. The reaction chamber is then pressurized. An injection manifold is positioned over selected samples and one or more chemical components are injected onto respective samples of the libraries with the sealed reaction chamber pressurized.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

Figure 1:
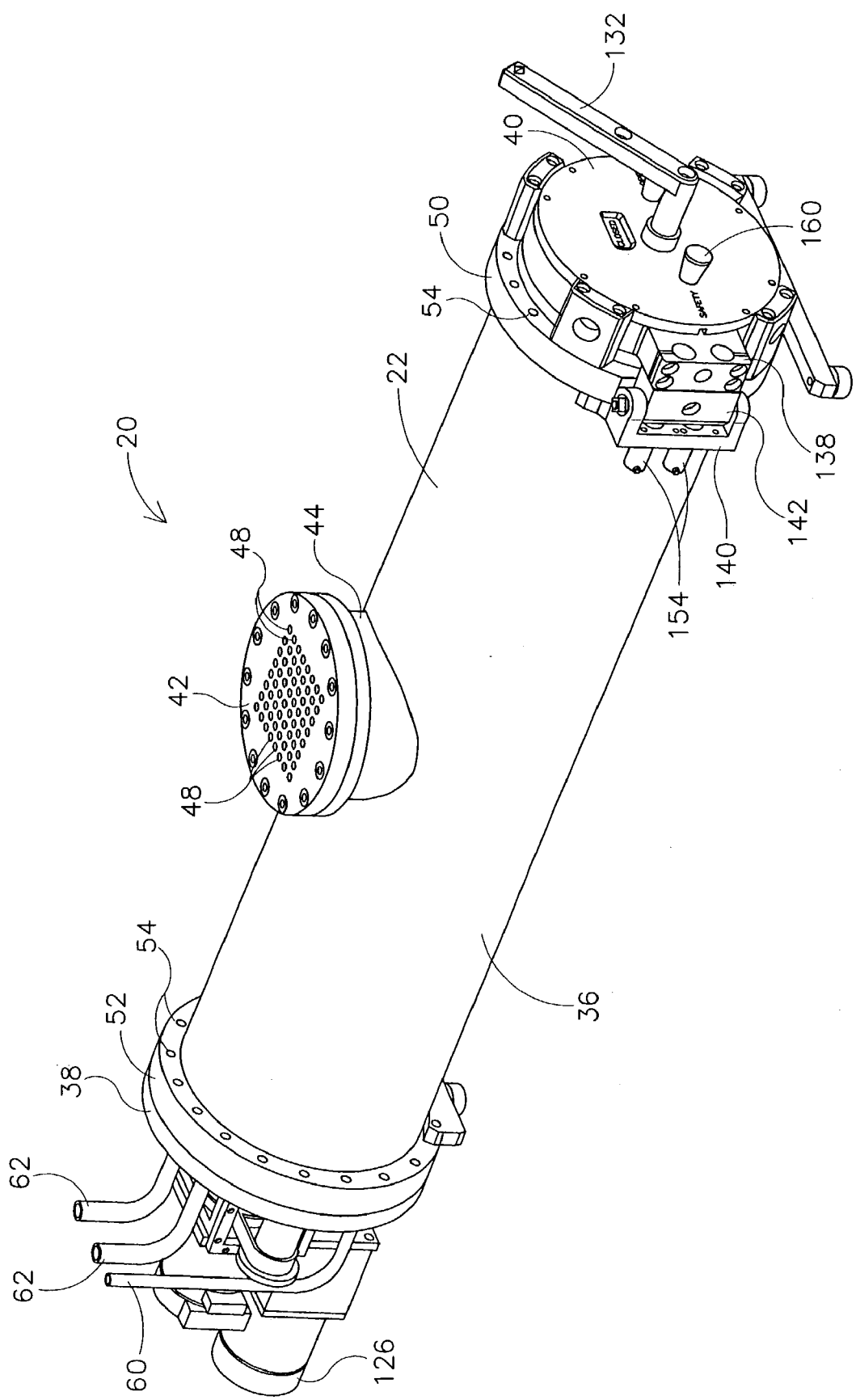
FIG. 1 is a front perspective of one embodiment of an apparatus of the present invention.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The following terms are intended to have the following general meanings as used herein:

Activator: An "activator" means any chemical species that is added to a catalyst precursor that enables a catalytic process.

Charging Agent: A "charging agent" means any chemical component introduced into the reaction chamber that contacts the samples, (e.g., the charging agent can be dissolved or absorbed into the sample). The charging agent may be, but is not limited to, a monomer, a catalyst, activator, scavenger, quenching agent, or any other chemical component or agent.

Chemical Components: "Chemical components" mean any chemical species (solid, liquid or gas) that are part of an experimental design, and may include, but are not limited to, solvents, ligands, metal precursors, activators, monomers, catalysts, catalyst precursors, scavengers, quenching agents, or other similar chemistry.

Library: A "library" means an array of samples formed on or supported by a common substrate. The library may include a plurality of different samples or may be comprised of an array of the same samples. The samples can be directly in contact with the substrate, or can be in a plurality of containers supported by a common substrate.

Scavenger: A "scavenger" means a chemical species added to remove unwanted species from the sample or reaction mixture.

Substrate: A "substrate" is a material having a rigid or semi-rigid surface. In many embodiments at least one surface of the substrate will be substantially flat. In some embodiments the substrate will contain physical separations between regions for different materials. Suitable physical separations include, for example, dimples, wells, raised regions, and etched trenches. According to other embodiments, small beads or pellets may be provided on the surface, either alone or within substrate surface dimples. The surface area of the substrate is designed to meet the requirements of a particular application.

Quenching Agent: A "quenching agent" is a chemical species that renders an active catalyst inactive by altering or destroying the catalyst. Quenching agents for olefin polymerization catalysts may include carbon dioxide and alcohols such as methanol.

The apparatus of the present invention may be used to screen two or more samples individually or as part of a library. The screening performed by the apparatus may include the gathering of data determinative of one or more properties of the samples or one or more characteristics of reactions or interactions for each of the samples, individually or collectively, or in conjunction with other chemical components. In particular, the apparatus may be used to screen for properties such as, but not limited to, material properties such as but not limited to, melting point, glass transition temperature, thermodynamic or kinetic parameters, emissivity or physical properties such as, but not limited to, spectral properties and or Theological properties. The apparatus may also be used to screen for characteristics of reactions such as, but not limited to, conversion, selectivity, heat of reaction, kinetic profile of heat of reaction, and exothermic/endothermic profiles, molecular weight, molecular weight distribution, or other thermal events or characteristic of the respective samples. The apparatus may be operated in serial or parallel modes to perform the screening process.

Figure 2:
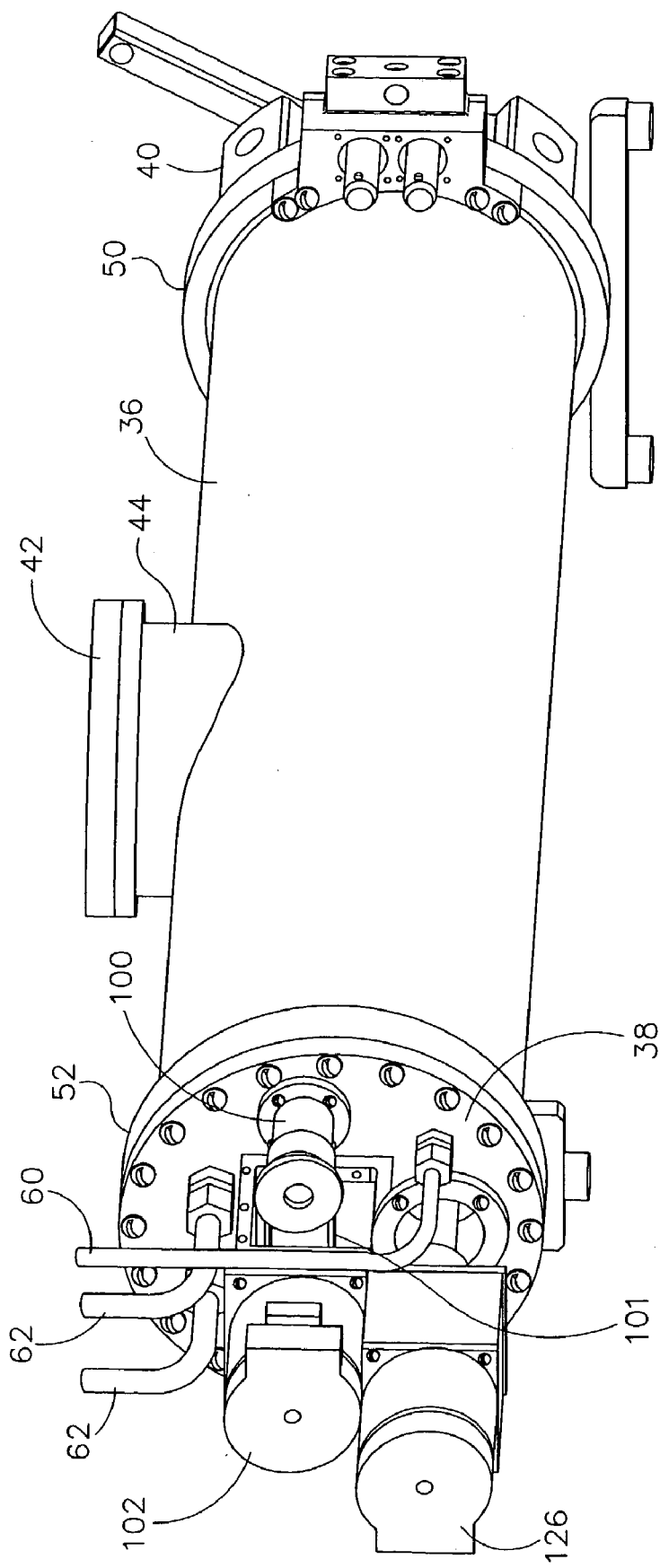
FIG. 2 is a rear perspective of the apparatus of FIG. 1.
Figure 3:
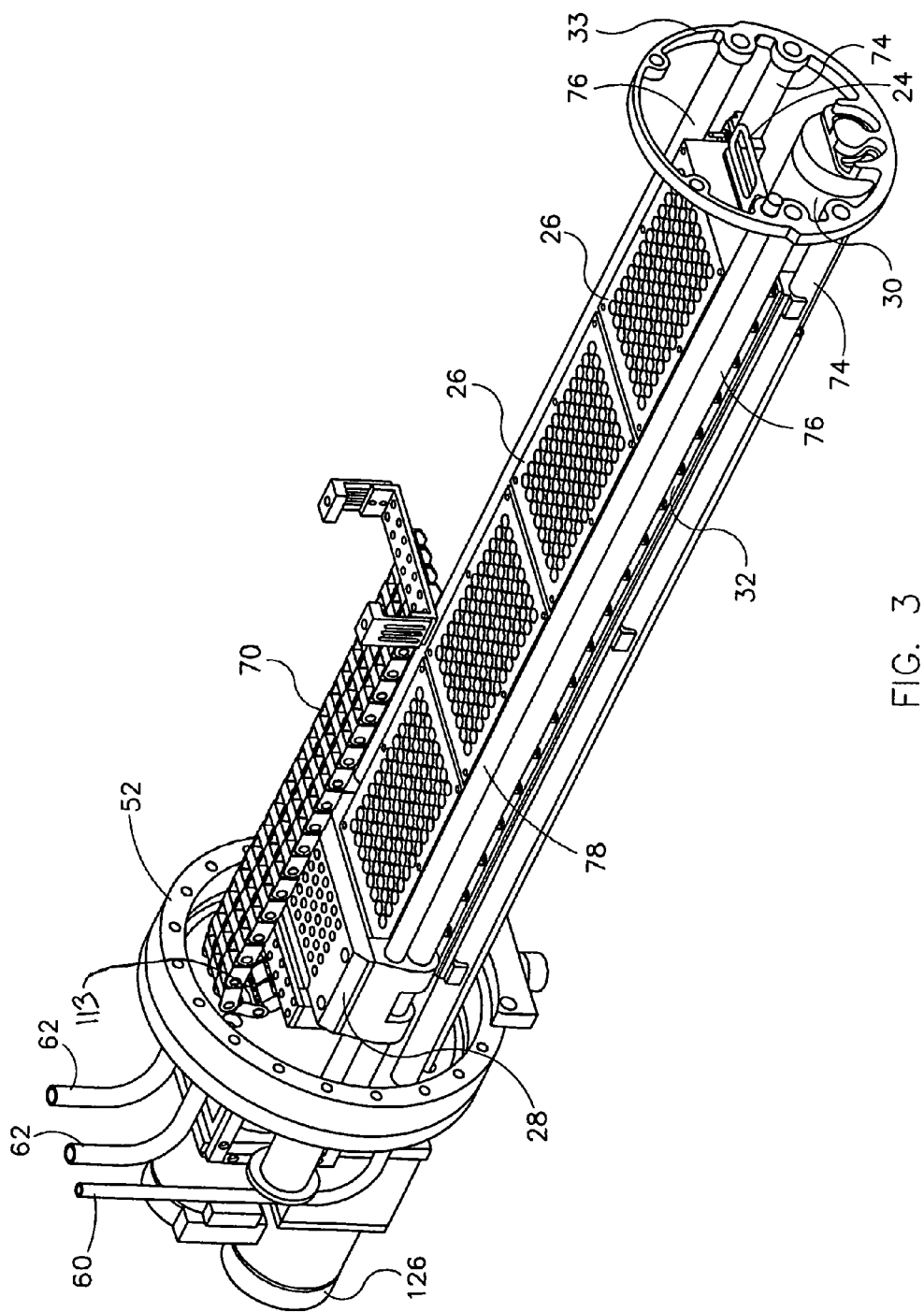
FIG. 3 is a front perspective of the apparatus of FIG. 1 with a housing and door removed to show detail.

Referring now to the drawings, and first to FIGS. 1–3 one embodiment of an apparatus of the present invention is shown and generally indicated at 20. The apparatus includes an enclosed pressure and temperature sealed reaction chamber 22, a sample tray 24 configured for supporting one or more libraries 26 within the sealed chamber, and an injection manifold 28 movable relative to the sample tray for injecting chemical components into one or more samples contained within the libraries. The injection of chemical components may occur when the sealed reaction chamber 22 is at a temperature and pressure different from or equal to ambient conditions. As described below, the apparatus 20 may also include a stirrer 30 and heater 32.

One method of using the screening apparatus 20 includes the steps of inserting one or more libraries 26 into the reaction chamber 22 and sealing the reaction chamber. The chamber 22 may then be filled with a charging agent such as a monomer or other chemical components that contact the samples. For example, the charging agent may be a polymerizable olefin such as ethylene, propylene, isobutylene, etc. Once the charging agent has been added, the system may be allowed to equilibrate at a desired temperature and pressure.

While the apparatus 20 is under equilibrated conditions, chemical components may be injected in-situ into the reaction chamber 22 to provoke or stimulate a chemical reaction or induce other chemical or physical changes in the respective samples. The chemical components may be injected into the reaction chamber 22 via the injection manifold 28 such that the chemical components may be applied to the respective samples of a library 26 as desired or simply injected into the reaction chamber and allowed to come into contact with the samples. It will be appreciated that all of the libraries 26 may be exposed to the same reaction conditions (i.e., reaction chamber temperature and pressure). The apparatus may also be used to perform semi-continuous additions to the samples.

Alternatively, the apparatus may be used in, but not limited to, the following manner: the chemical components may be injected into the reaction chamber 22 or directly onto respective samples without charging the reaction chamber (i.e., the reaction chamber is not pressurized with a charging agent), or the apparatus can be charged with the charging agent and no other chemical components injected into the reaction chamber or onto the respective samples.

The apparatus may also be used, for example, to quench reactions at different times by adding a quenching agent such as a catalyst poison. This may improve interpretation of screening results for arrays of materials that exhibit a broad range of catalytic activity. For example, if every reaction within an array is allowed to proceed for the same amount of time, the most active catalysts may generate an excessive amount of product, which can hinder post reaction analysis and reactor clean up. Conversely, the least active catalysts within the array may generate an amount of product that is insufficient for characterization. By limiting the reaction time for individual wells within an array through, for example, monitoring the amount of product in each of the vessels through a gaseous monomer uptake measurement, mechanical oscillators or phase lag measurements, the user can stop a particular reaction by injecting the catalyst poison into the vessels once a predetermined conversion is achieved. Thus, within the same reactor and in the same experiment, low and high activity catalysts may undergo reaction for relatively long and short time periods, respectively, with both sets of catalysts generating about the same amount of product. Furthermore, with the ethylene pressure being controlled, the fluid injection system allows for easier manufacture of block copolymers via the addition of comonomer through the injection port.

Referring again to FIGS. 1 and 2, the sealed chamber 22 is defined by a housing 36 formed from a tubular member, an end plate 38 attached at one end of the housing, a door 40 attached at the opposite end of the housing, and a fluid transfer plate 42 coupled to a member 44 projecting from a sidewall of the housing. As described further below, the end plate 38 includes a plurality of openings for receiving inlet and vent lines, injection manifold drive system, stirrer system, and heating system. The door 40 is movable between an open position for insertion or removal of the libraries 26 from the chamber 22, a closed/locked position for creating a sealed chamber, and a closed/safety position in which the door is slightly opened to allow the chamber to vent (discussed below). The fluid transfer plate 42 includes a plurality of openings 48 for receiving fluid transfer tubes which are coupled at one end to the injection manifold 28 for delivering chemical components to the samples and at the other end to a pump for supplying the chemical components (discussed below).

End rings 50, 52 are preferably welded to each end of the housing 36 to provide attachment points for the end plate 38 and door 40. Each ring 50, 52 includes a plurality of mounting holes 54 for receiving fasteners such as bolts or other fastening means.

The housing may be formed of a metal or composite material. In the disclosed embodiment, the housing may be fabricated using a 316 stainless steel seamless tube. The thickness of the tubular member may be selected based on the ambient conditions and internal pressures to which the apparatus will be exposed. One of skill in the art will understand that other materials having sufficient thermal, material or corrosion resistant properties may be used to fabricate the housing. It is to be understood that the housing may be configured using other simple or complex geometric shapes.

The fully assembled and sealed reaction chamber 22 may be pressurized and maintained in pressure and temperature equilibrated conditions for a predetermined time period. The housing 36 can be designed to withstand predetermined pressure and stress levels. Finite element analysis can be used to calculate the anticipated stress levels, and one of skill in the art will appreciate that the exact dimensions of the housing will vary depending on the stress and pressure levels to which the housing will be exposed. In the disclosed embodiment, the housing is designed to withstand an internal maximum pressure of approximately 200 psi, vacuum pressure levels of approximately $10^{-4}$ Torr, and to withstand, at a minimum, stresses of approximately 3.0 times the yield strength and 1.5 times the tensile strength of the material forming the housing. The housing may also be designed, for example, to operate at pressures of 5 psi, 10 psi, 50 psi, 100 psi, 500 psi, 1000 psi, or other selected pressures.

Figure 4:
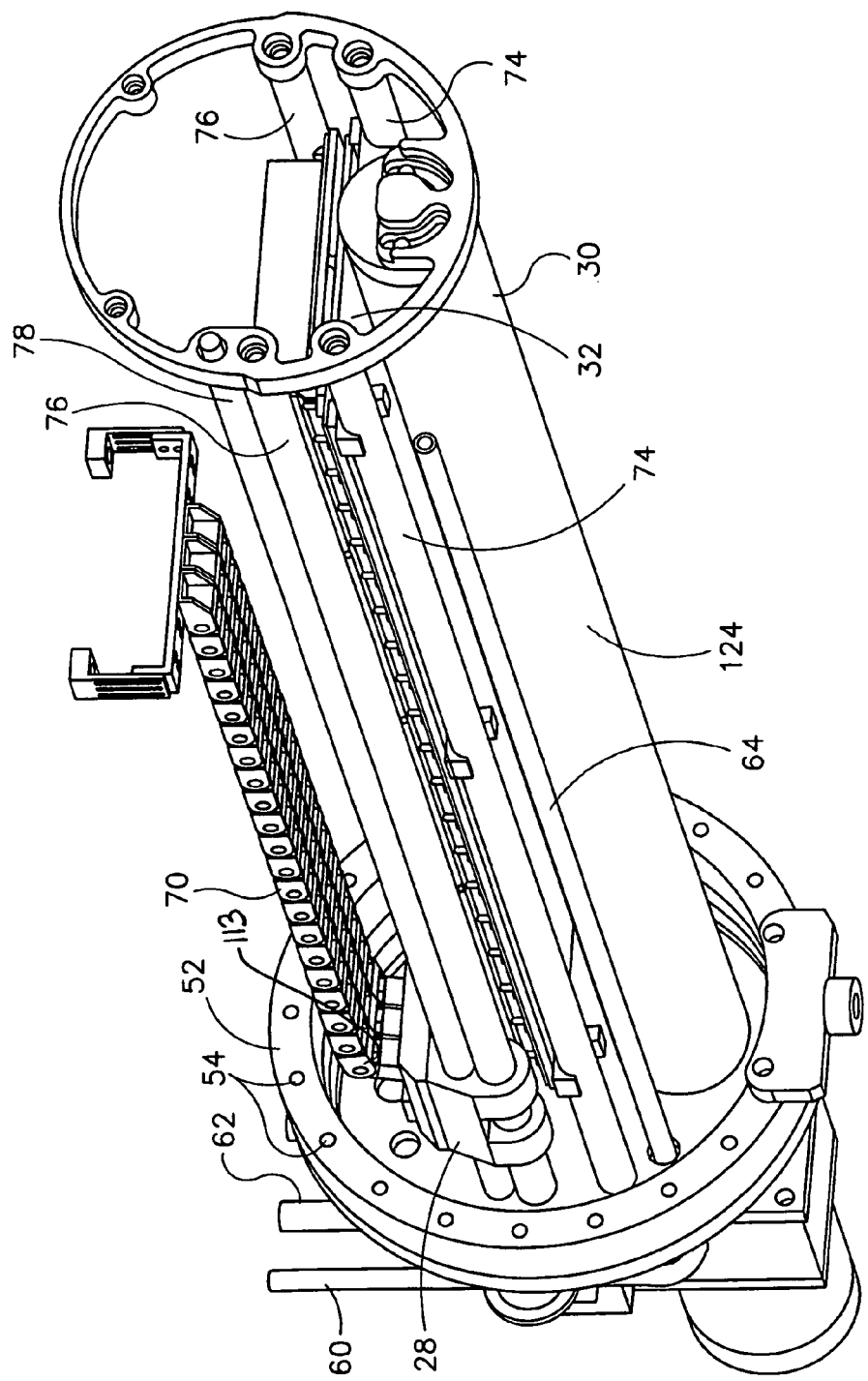
FIG. 4 is a bottom perspective of the apparatus of FIG. 3.

The reaction chamber 22 is pressurized via an inlet line 60 attached to the end plate 38 (FIGS. 2 and 4). The inlet line 60 may be formed from ¼ inch outer diameter tubing, for example. It is to be understood that the apparatus 20 may include any number or configuration of inlet lines 60 positioned in various locations. If more than one inlet line 60 is included, each inlet may be separately coupled to the same or different charging agents. The inlet line 60 is coupled to an inlet tube 64 that extends longitudinally in the tubular member (FIG. 4). It will be appreciated that the length of the inlet tube 64 can be designed to permit time for the incoming fluid to undergo temperature and pressure equilibrium with the receiving environment and facilitate replacement of the existing environment with an incoming charging agent, for example. The exact length of the inlet tube 64 may be determined based on the specific fluid to be introduced into the reaction chamber 22.

In the disclosed embodiment, two vent ports are formed in the end plate 38 for receiving two vent lines 62 which allow the sealed chamber 22 to be vented upon the occurrence of predetermined conditions. The vent lines may be formed, for example, from ⅜ inch outer diameter tubing. The vent ports may support gauges for monitoring the internal pressure of the reaction chamber. The vent ports may also be coupled to a vent control valve and a pressure release mechanism (not shown). The vent control valve causes the venting of the reaction chamber 22 upon occurrence of a predetermined pressure, and the pressure release mechanism may be electrically coupled to a computer or processor that commands opening of the control valve. For example, the computer can be programmed with a preset time period for performance of the screening. At the end of the preset time period, the computer issues a command causing the pressure release mechanism to open, releasing the pressure in the reaction chamber. It will be understood that the vent control valve may be controlled manually rather than computer controlled and a burst disk may also be provided. Pressure may also be controlled during the experiment with a mass flow controller, back pressure controller or other suitable device.

The end plate 38 further includes an opening for receiving a magnetic feed through coupled to a stepper motor drive system which imparts motion to the injection manifold 28 (discussed in detail below). The end plate 38 may also support a gauss level sensor for homing the selectively movable injection manifold 28. An opening for a servomotor used to drive a magnetic stirrer is also provided, along with temperature control and power feed through for a heater block of a heating system. Suitable sealing is provided at each component interface with the end plate 38. One of skill in the art will appreciate that these components may be enclosed in a casing in order to provide a barrier or seal isolating the access points into the reaction chamber 22 from ambient pressure and temperature.

Additionally, the reaction chamber 22 may support various sensors and sampling devices or probes for measuring temperature and pressure or analyzing contents therein, including the contents of wells within libraries therein. Sensors include but are not limited to pressure and temperature transducers and related devices (infrared cameras, thermocouples and thermisters), fiber optic sensors for measuring spectroscopic or other physical properties, chemical composition analyzers, and devices for determination of mechanical and rheological properties. Sampling devices and probes include but are not limited to liquid handling robots such as, for example, those manufactured by Cavro Scientific Instruments, Inc. (San Jose, Calif.). Sensors and sampling devices may be positioned within the reaction chamber 22 to provide for sampling and chemical analysis of one or more of the reaction wells within libraries contained therein. For example, the aforementioned serial or parallel injector arrays may be fitted with sensors or used to sample material from wells within libraries in the chamber or sample the environment within the chamber. In another embodiment, the reaction chamber can be fitted with valves that allow sampling devices and sensors to penetrate the valves and remove or analyze material from within the chamber or wells within libraries for analysis. One of skill in the art will appreciate that all gauges or sensors may be actuated and monitored manually or via computer. One of skill in the art will appreciate that all gauges or sensors may be monitored manually or via computer. For example, a computer system may be used for monitoring and storage of data gathered from sensors.

Figure 5:
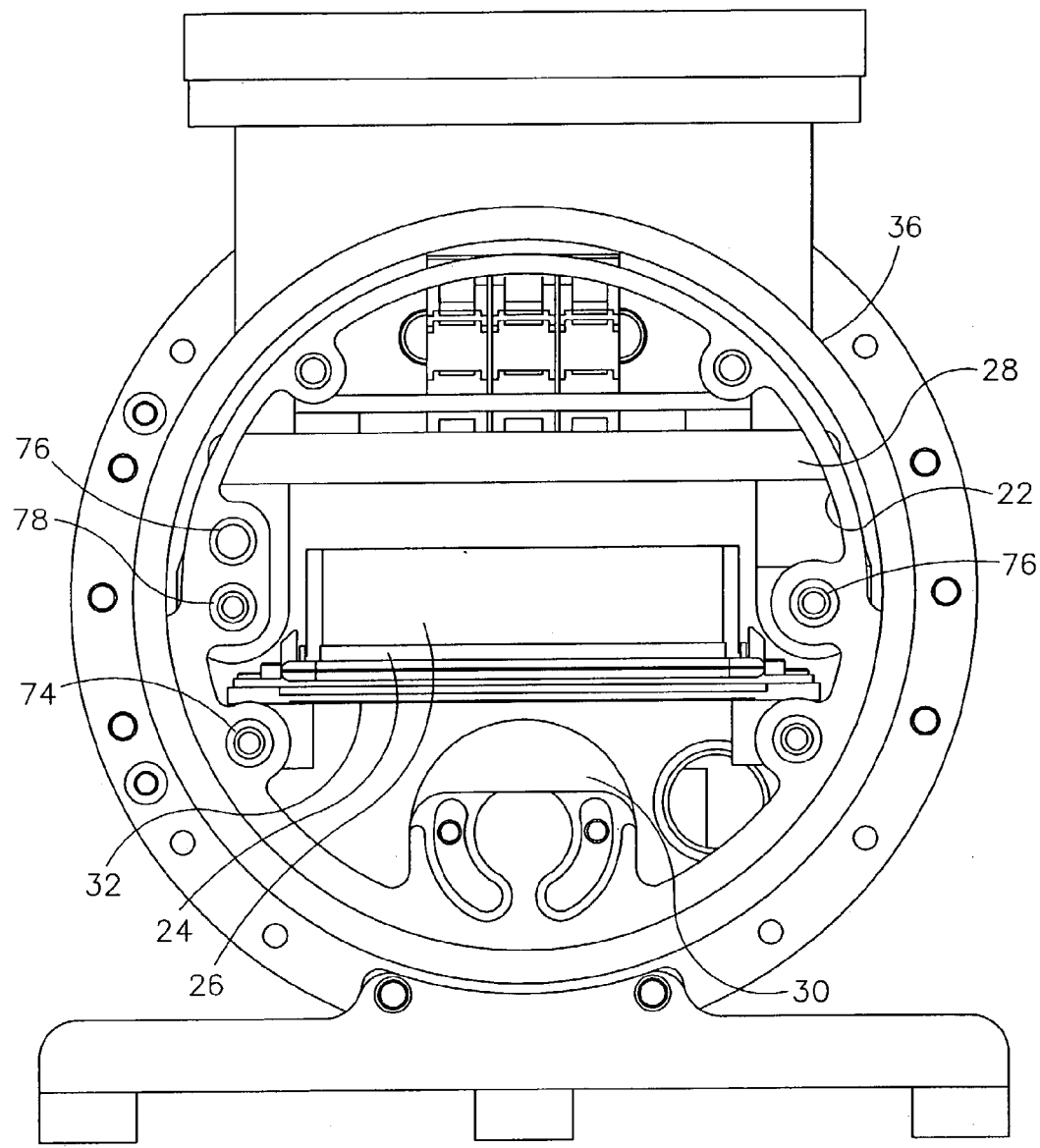
FIG. 5 is an end view of the apparatus of FIG. 1 with the door removed to show internal components.

Internal components of the reaction chamber 22 are shown in FIGS. 3–5 and include the fixedly mounted sample tray 24 supporting a plurality of sample plates (libraries) 26, injection manifold 28 movably mounted with respect to the sample plates, track 70 for retaining fluid transfer lines 72 coupled to the injection manifold (shown in FIG. 7), stirrer assembly 30, and heater block 32. Four rods (two support rods 74 and two guide rails 76) extend longitudinally through the housing and are attached at each end to the end rings 50, 52. The two support rods 74 (lower two rods as viewed in FIG. 5) are positioned to support the heater block 32 and sample tray 24. The injection manifold 28 is slidably mounted on the two guide rails 76. A lead screw 78 extends the length of the housing for imparting linear motion to the injection manifold 28 for movement relative to the sample plates 26 (discussed below).

Figure 6:
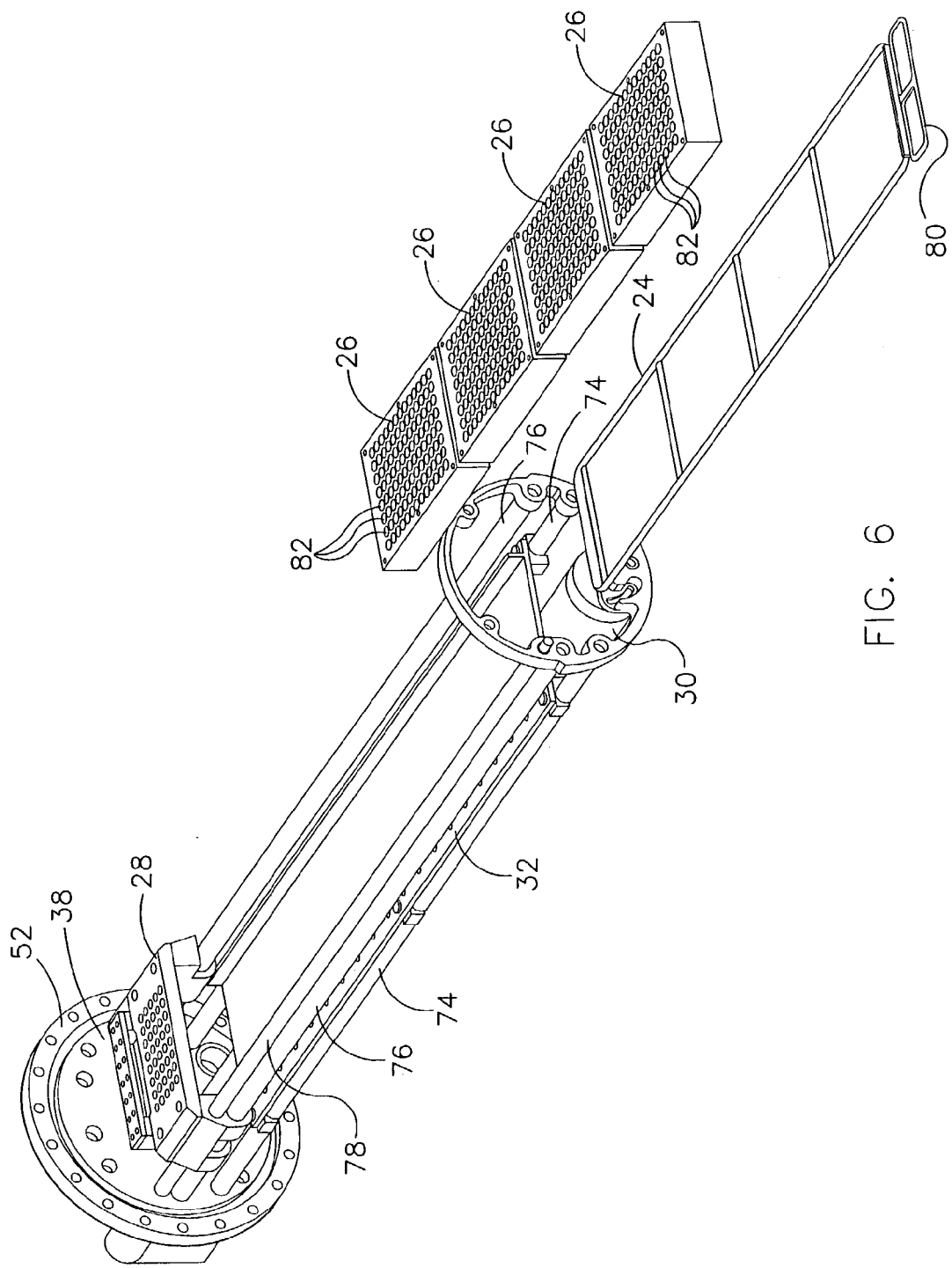
FIG. 6 is a partial exploded view of the apparatus of FIG. 3 with parts removed.

As shown in FIG. 6, the sample tray 24 supports a plurality of sample support plates 26 (four shown). The sample tray 24 is retained in the reaction chamber 22 in a fixed position relative to the reaction chamber. It is to be understood that the fixed position may vary between screening processes, but the tray 24 and libraries 26 remain generally stationary within the reaction chamber 22 during an injection process. The sample support plate 26 is in the form of a substrate and supports a library containing one or more material samples. It will be appreciated that the apparatus may include one or more sample plates, each sample plate supporting a library of samples. More particularly, the apparatus may include two, four, or more sample plates. The sample tray 24 may include a handle 80 for ease of insertion and removal of the sample plates 26 to and from the reaction chamber.

The sample plate 26 defines an array of adjacent wells 82 such that each well is connected to an adjacent well by an intermediate mass of material. It will also be appreciated that the wells can be individually formed and remain unconnected. Samples may also be retained in individual containers such as glass vials which are inserted into the wells 82. The sample plate may be fabricated in a variety of configurations using both simple and complex geometric shapes, including but not limited to circles, squares, rectangles, octagons, etc. Additionally, the sample plate may comprise a flat plate having a plurality of depressions formed therein, wherein each depression is designed to support a liquid or solid sample. In one embodiment, the sample plate 26 may be a microtiter plate.

One of skill in the art will appreciate that materials such as, but not limited to, metals, ceramics or plastics may be used. In the disclosed embodiment, the tray 24 is configured to hold four sample plates 26, each sample plate having 96 wells. It is to be understood that any number of sample plates having the same or different number of wells may be used without departing from the scope of the invention.

As previously discussed, the injection manifold 28 is selectively movable relative to the sample support plates 26 (FIG. 3). The injection manifold 28 may be used in a variety of applications where it may be desirable to introduce chemical components into a vessel, where the vessel can be maintained at ambient or other pressure and temperature conditions. The injection manifold 28 allows one or more chemical components to be injected or introduced in-situ into the reaction chamber 22. During the injection of chemical components, the reaction chamber 22 may be at a pressure the same as or different from ambient conditions. If the reaction chamber 22 is at a pressure different from ambient pressure, the injection can take place without increasing or decreasing the pressure in the reaction chamber.

Figure 7:
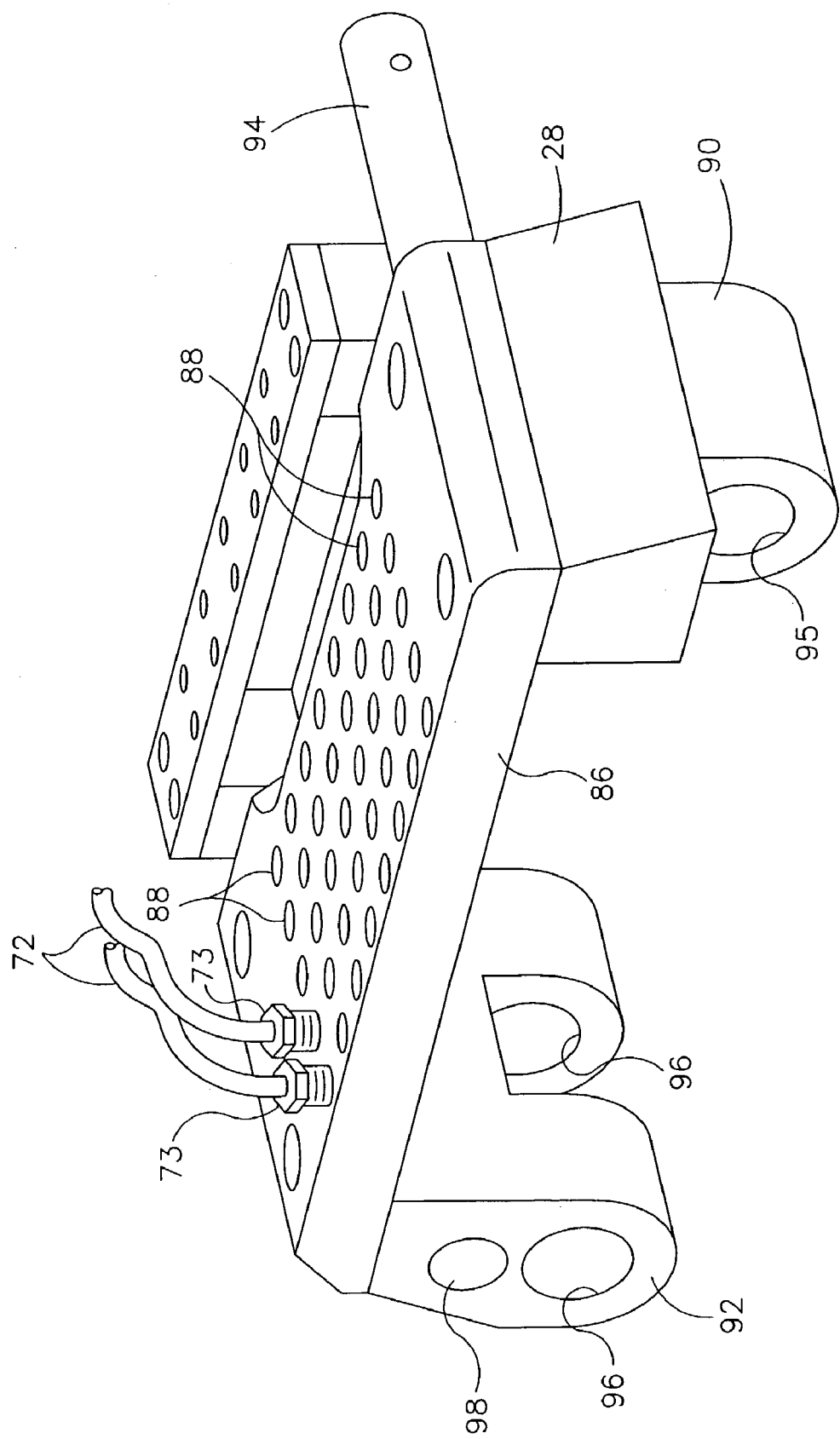
FIG. 7 is a perspective of an injection manifold of the apparatus of FIG. 1.
Figure 8:
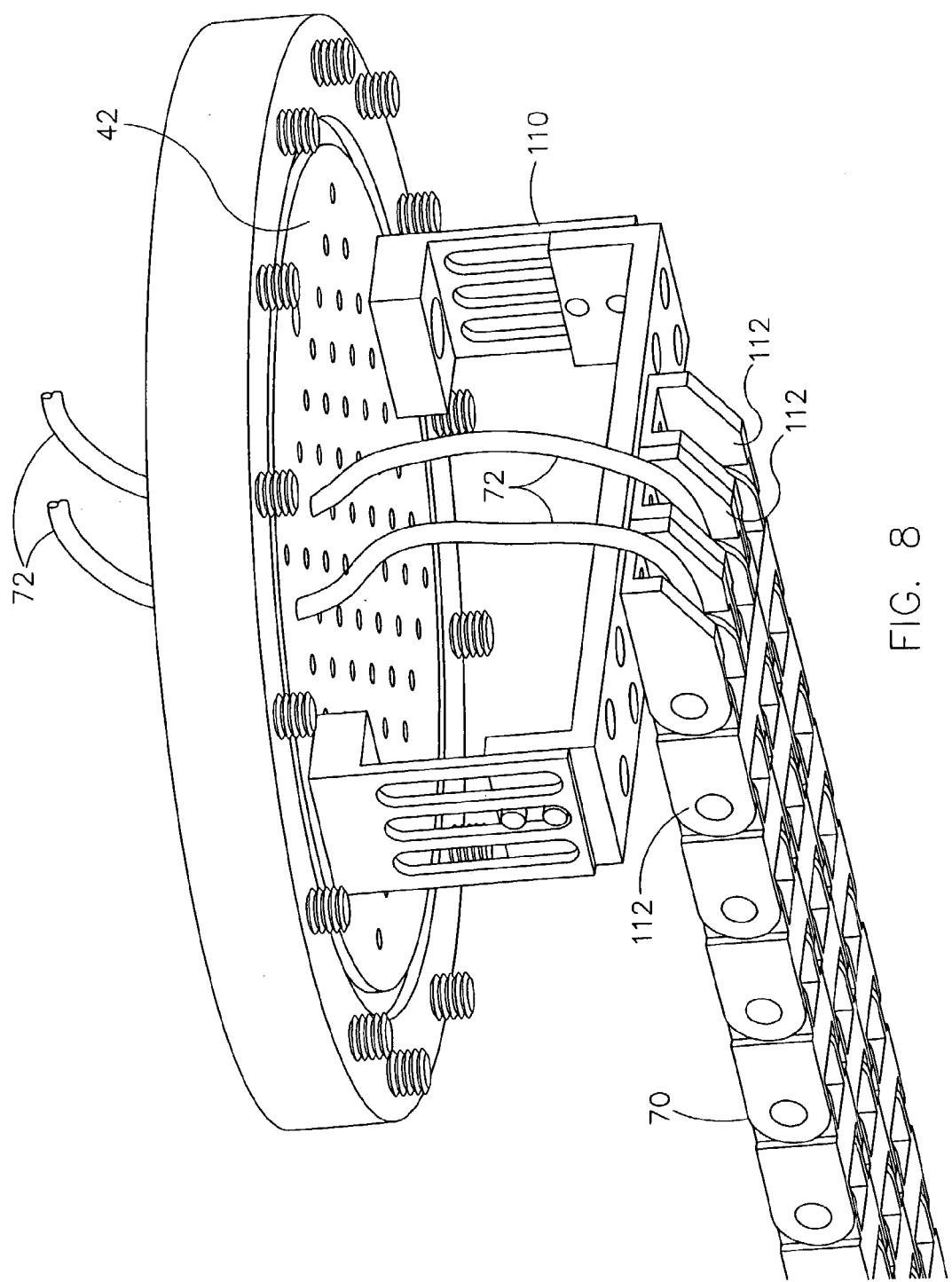
FIG. 8 is a perspective illustrating details of a track support and fluid transfer plate.

The injection manifold 28 is coupled to one or more injectors 73 that are attached to the fluid transfer lines 72 (FIG. 7). The injector may be retained within a fitting coupled to the line 72 for attaching the line to the injection manifold 28 (as shown in FIG. 7), or the injector may be formed by the terminus of the actual line. Each line 72 is connected at an upstream end to a pump 87, 89 (shown schematically in FIGS. 9A and 9B) which supplies chemical components for in-situ injection into the sample wells. The downstream end of each line 72 is connected to the injector manifold 28 and movable therewith to inject fluid into a selected sample when the manifold is positioned over the sample. The manifold 28 moves along the guide rails 76 and is positioned above specific samples for insertion of chemical components into selected sample wells. As described below, the line 72 is retained within a flexible chain to prevent tangling or kinking of the tubes during movement of the injection manifold 28 (FIGS. 3 and 8).

The injection manifold 28 includes an injector head 86 having a plurality of openings 88 for receiving downstream ends of the fluid transfer lines 72. The injectors 73 may be inserted into openings 88 for receiving the fluid transfer lines 72 or the lines may be inserted directly into the openings with the tube ends forming the injector, as previously discussed. The injector head 86 includes an opening for receiving a homing magnet 94 for operation with a gauss level home sensor (not shown) supported by the end plate 38. The gauss level sensor is used to sense the home position of the injection manifold 28 so that the manifold can be moved a specified distance relative to this home position to accurately position the manifold 28 over selected samples. The homing magnet 94 cooperates with the gauss level sensor to calibrate the injection manifold 28 to a preset home or start position. The homing magnet and the gauss level sensor operate to control the distance that the injector manifold travels. For example, the injection manifold home or starting position established due to the cooperation of the homing magnet 94 and the gauss level sensor may be programmed into a computer. The computer monitors and controls the movement of the injector manifold using the home or starting position as a reference. The gauss level sensor may be, for example, one available from Sensor Solutions Corp. of Colorado, under product designation M12x1-000AHSw.

Guide rail slides 90, 92 are mounted on opposite ends of the head 86 and extend from one side thereof (FIG. 7). The guide rail slides (or bearings) 90, 92 may also be integrally formed with the injector head 86. Slide 90 includes an opening 95 having a diameter slightly larger than an outer diameter of the guide rail 76 (FIGS. 6 and 7). Slide 92 includes two aligned openings 96 also sized to receive the guide rail 76 and slidably movable thereon. Slide 92 also includes a threaded opening 98 for receiving the threaded rod 78 for imparting controlled linear movement to the injection manifold 28 (FIGS. 6 and 7). The threaded rod 78 may be an Acme screw, for example. The threaded rod 78 may be coupled to a magnetic feed through 100, which, in turn, may be coupled to a stepper motor 102 through a belt drive 101 (FIG. 2). The injection manifold 28 is caused to traverse the housing 36 by sliding along the guide rails 76 upon rotation of the threaded rod 78 coupled to the manifold 28 (FIGS. 2 and 3). As the threaded rod 78 rotates in a clockwise direction, for example, the injection manifold 28 slides along the guide rails towards the door 40. When the threaded rod rotates in the counterclockwise direction, the injection manifold 28 slides away from the door 40.

The magnetic feed through 100 may be of a type conventionally used in the industry, and may include a magnetic driver assembly having one end coupled to the belt drive assembly 101 and the other end magnetically coupled to a magnetic follower. Rotation of the belt drive system induces a torque in the magnetic driver. Because of the magnetic coupling between the driver and the follower, rotation of the driver assembly induces rotation of the follower. The follower is coupled to the threaded rod 78 using generally known fastening and sealing techniques in order to maintain a pressure tight seal between the point of entry of the magnetic feed through into the chamber 22. Hence, rotation of the follower results in rotation of the threaded rod 78, and as a result, the injection manifold 28, which is movably supported on the threaded rod, is caused to linearly traverse the threaded rod when the magnetic feed through and belt drive 101 are activated. The motor may be, for example, a stepper motor available from Oriental Motor Co. Ltd. of Japan under product designation PK266M-E2.0AR11.

As best seen in FIGS. 3 and 8, the fluid transfer line 72 is retained within track 70 mounted to the fluid transfer plate 42 and injection manifold 28 to prevent twisting or kinking of the line during linear movement of the injection manifold 28. The track 70 is rigidly mounted at one end to a track mount 110 connected to the fluid transfer plate 42. The track mount 110 may be mounted directly to an internal sidewall of the projecting member 44, to the fluid transfer plate 42, or both (FIGS. 1 and 8). The track 70 comprises a plurality of line (tube) carriers or chains 112 (three shown). Each carrier 112 forms tubular cavity for retaining one or more lines 72 (only two lines shown in FIG. 8). The track 70 is formed from a low torsion cable that includes a small bending radius 113 (FIGS. 3 and 4), which allows the track to move along with the injection manifold in a repeatable fashion in an unsupported manner. In one embodiment eight lines are retained in each carrier 112 to provide a total of twenty-four fluid transfer lines. It is to be understood that a different number of carriers 112 or lines 72 per carrier may be used without departing from the scope of the invention. For example, the track 70 may be comprise five line carriers 112 with eight lines 72 retained in each carrier for a total of forty transfer lines. The track 70 may be formed from a polymer and may include snap coverings over the u-shaped carrier to retain the tubes in place. The track may be formed from a chain such as available from IGUS, Inc. of Rhode Island under part number 03-07-015, for example.

The lines 72 may be formed from any suitable polymer tubing, such as TEFZEL (ETFE) available from DuPont, for example. The tubing 72 is preferably inserted into injectors 73 fitted within the openings 88 on the injector head 86 (only two shown in FIG. 7). As discussed above, the tubing 72 may also be inserted directly into the injector head 86 with the tubing ends forming the injector. The tubing 72 is preferably tapered (e.g., by swaging) at its downstream end such that both the inner and outer diameter are reduced. This increases the velocity of the fluid leaving the tube which may increase the accuracy and precision of fluid injection.

Figure 9A:
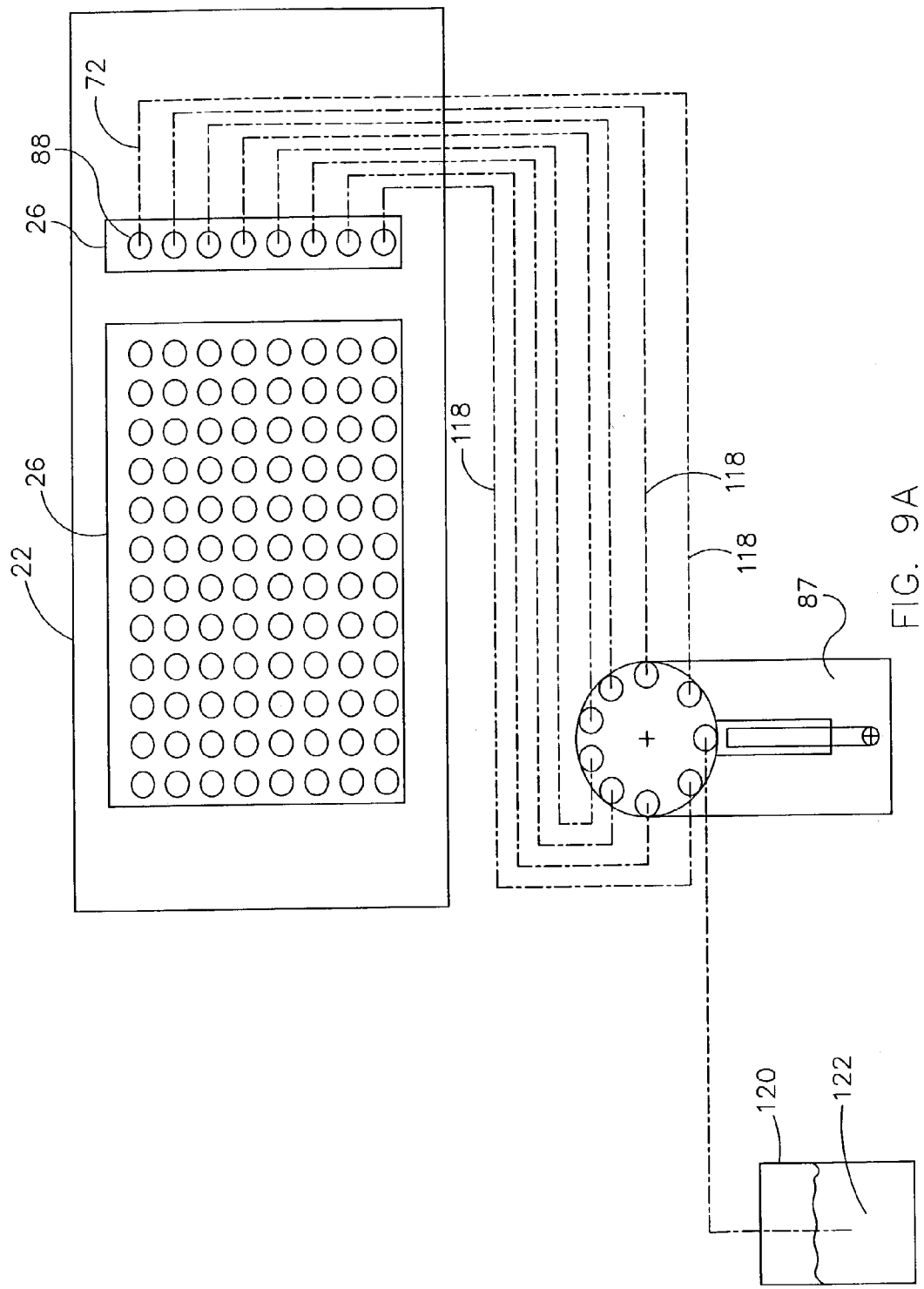
FIG. 9A is a schematic illustrating one embodiment of the apparatus of FIG. 1 coupled to a source of chemical components through a serial pump.

As described above, openings 88 in the injection manifold 26 are coupled to one or more injectors 73 that may be separately coupled to a supply of chemical components up-stream. Each fluid transfer line 72 may be coupled to a single multi-channel serial pump 87 using known fastening techniques (FIGS. 7 and 9). As best seen in FIG. 9A, the pump 87 may include eight outlets or channels 118, wherein each channel may be rotated serially into fluid communication with each of the fluid transfer lines 72. The pump 87 is of a type known in the industry, and one of skill in the art understands how the pump operates. A pump such as one available from Tecan Systems, under product designation XR729848, may be used, for example.

Figure 11:
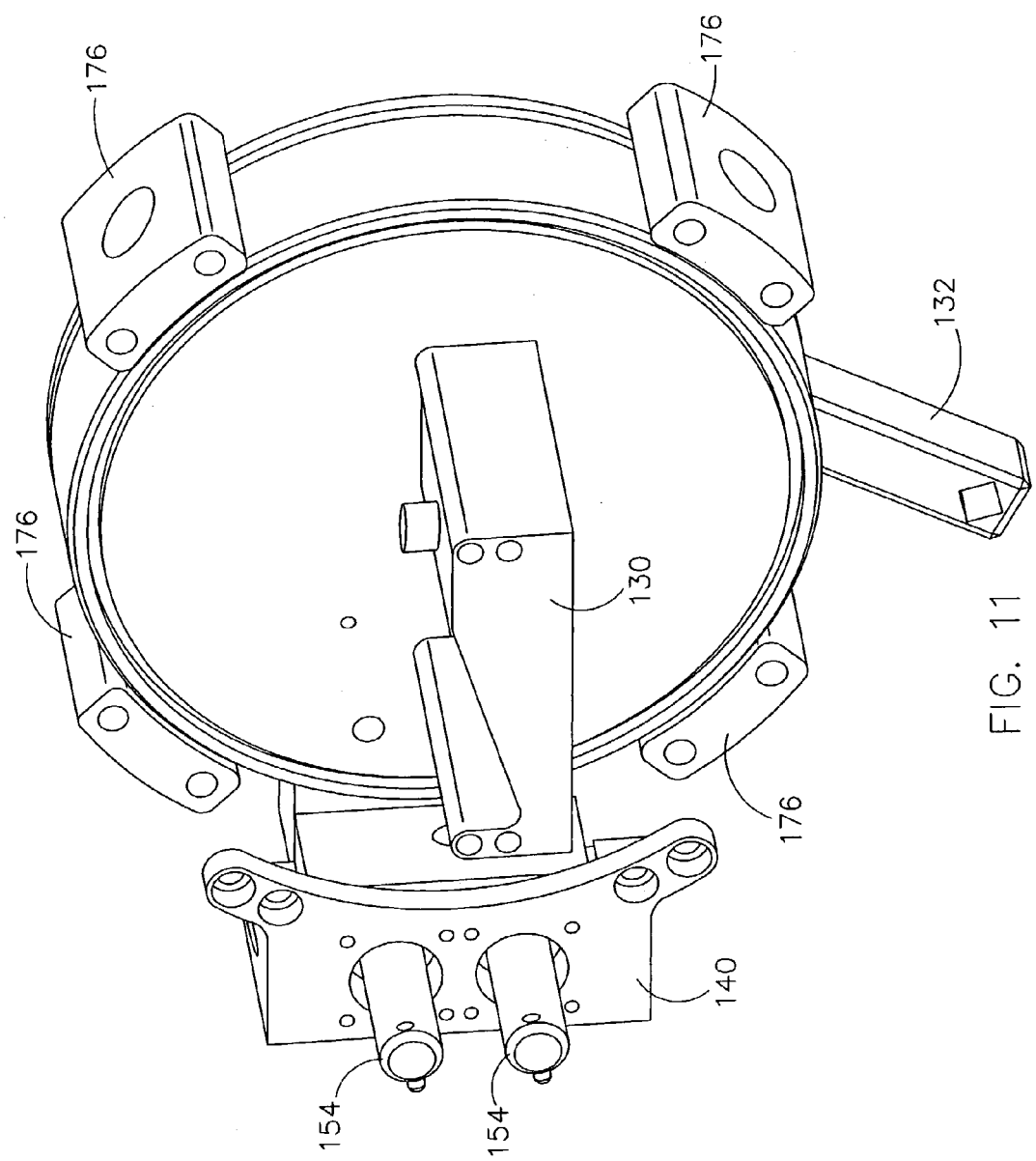
FIG. 11 is a rear perspective of the door of the apparatus of FIG. 1.

The multi-channel serial pump 87 permits each outlet to be coupled to different chemical components, including solvents. Thus, each fluid transfer line 72 may receive one or more chemical components during the course of the experiment. In the embodiment shown, one pump transfers chemical components 122 from one or more supply sources 120 to eight injector channels 118. It is to be understood that additional pumps and channels may be provided. For example, five pumps each having eight channels may be used to provide chemical components to forty separate injectors. A pump may also be used to remove waste from the waste basin 130 (FIG. 11).

Figure 9B:
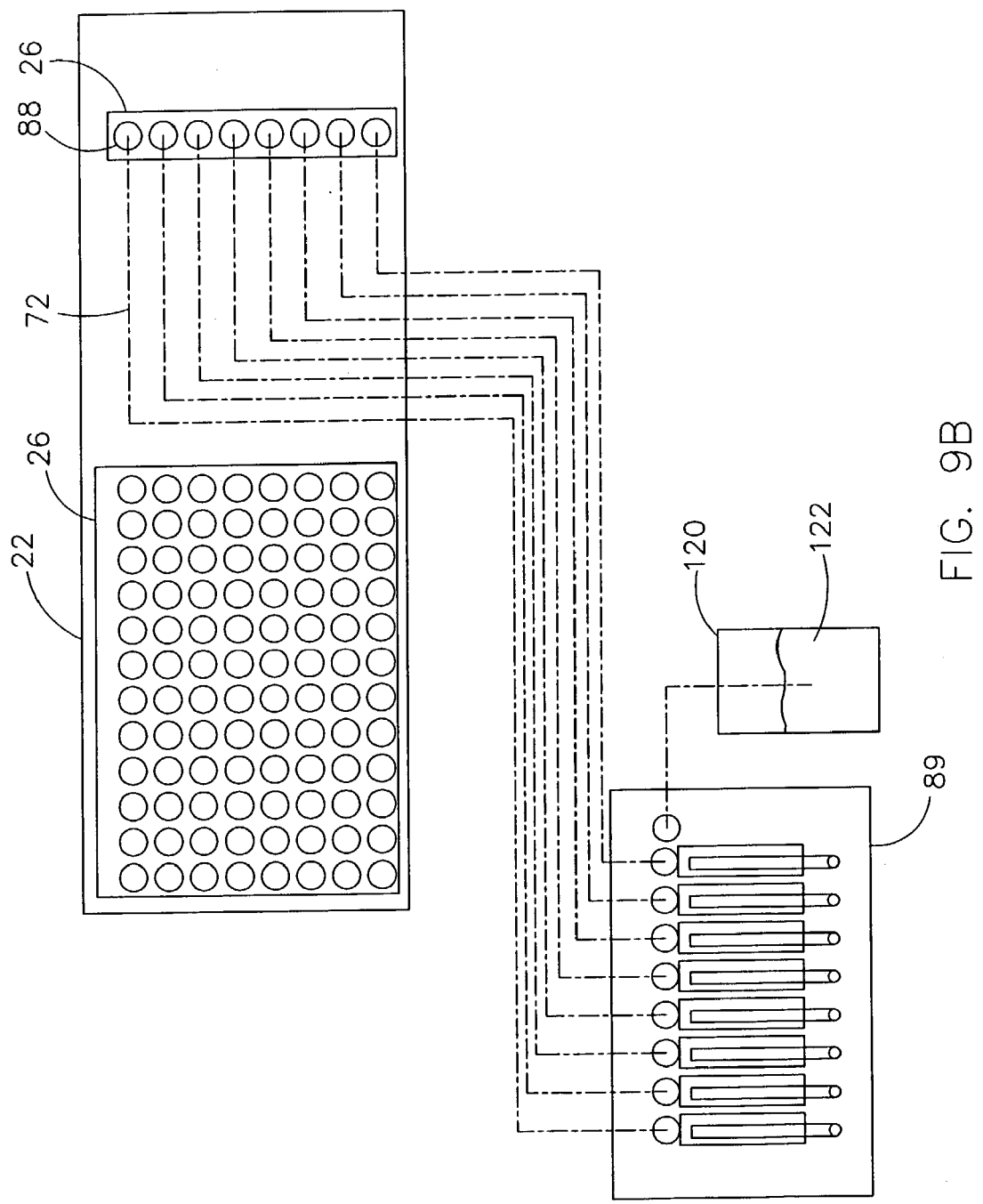
FIG. 9B is a schematic illustrating one embodiment of the apparatus of FIG. 1 coupled to a source of chemical components through a parallel pump.

FIG. 9B illustrates another embodiment utilizing a parallel pump 89 of the type known and used in the industry. In this case, each pump 89 is coupled to separate injectors and a common fluid supply via channels. In the embodiment shown, one pump transfers chemical components 122 from one or more supply sources 120 to eight injector channels (lines 72). It is to be understood that additional pumps and channels may be provided.

In an alternative embodiment, each injector may be coupled to a separate pump 87, 89 and supply of chemical components 122.

As previously discussed, a heating system may be used to heat the samples in the sealed reaction chamber 22. Referring again to FIGS. 4 and 5, heater block 32 is positioned below (as viewed in FIG. 5) the sample tray 24 and supported by the lower support rails 74. The heater block 32 is designed to permit homogeneous heating across its surface. Thus, the heater block may be constructed of a material having high thermal conductivity. The top surface of the heater block 32 may be bead blasted or polished to homogenize the surface, and the entire heater block may be black anodized and Teflon® sealed. However, any other polymer coating that enhances the corrosion resistance of the heater block 32 may be used.

A flexible heating element (not shown) may be coupled to the underside of the heater block. In the disclosed embodiment, a Kapton® substrate supporting a heating element, (e.g., a resistive heater) is coupled to the heater block 32 using a contact adhesive. Kapton® is a high-strength polyimide film available from DuPont. One of skill in the art will appreciate that other polyimide film or any other material that can support a resistive heating element may be used in place of the Kapton® polyimide film. Also, a thermocouple (not shown) may be coupled to the heater block for temperature control purposes. The opposite side of the Kapton® heater may be coupled to an interface plate using a contact adhesive. The interface plate may be made of a low thermal conductivity material in order to help reduce heat transfer from the heater block to adjacent external components.

The heater block 32 is preferably configured to heat the samples to 140° C. in under 30 minutes. The apparatus 20 may also include a heating blanket (not shown) wrapped around the housing 36 to provide additional heating to the reaction chamber 22 and prevent internal condensation of volatile materials (such as chemical components and products of reactions) as well as heat loss from the chamber.

In a preferred embodiment, the apparatus 20 includes a mechanism or means for agitating the samples either individually or collectively. For example, the apparatus may include a tumble stirrer, such as an Alligator Microplate Magnetic Stirrer available from V&P Scientific, Inc. of California. The stirrer system 30 includes a plurality of magnets (not shown) encased within a rod contained within a stainless steel tube 124 having one open end (FIG. 4). The rod includes bearings at each end mounted within a flex coupling and bearing block. One bearing block is contained with the steel tube 124 and the other end is retained within the end plate 38 and connected to a servomotor 126 (FIGS. 2 and 4). A magnetic disc, bar, dowel or other shape stirrer (not shown) is inserted into one or more the wells 82 of the sample plates 26. The attraction of the stirrers to the vertical driving magnetic field causes the stirrers to stand on end and tumble as the stir devices try to align to the opposite moving magnetic pole during movement of the magnets by the servomotor 126, as is well known by those skilled in the art.

Alternatively, agitation may be introduced into the samples by other means or techniques, including, but not limited to, vibratory devices, electromechanical/electromagnetic instruments, ultrasonic devices, or other similar devices or instruments for stimulating the samples at a molecular or particle level.

Figure 12:
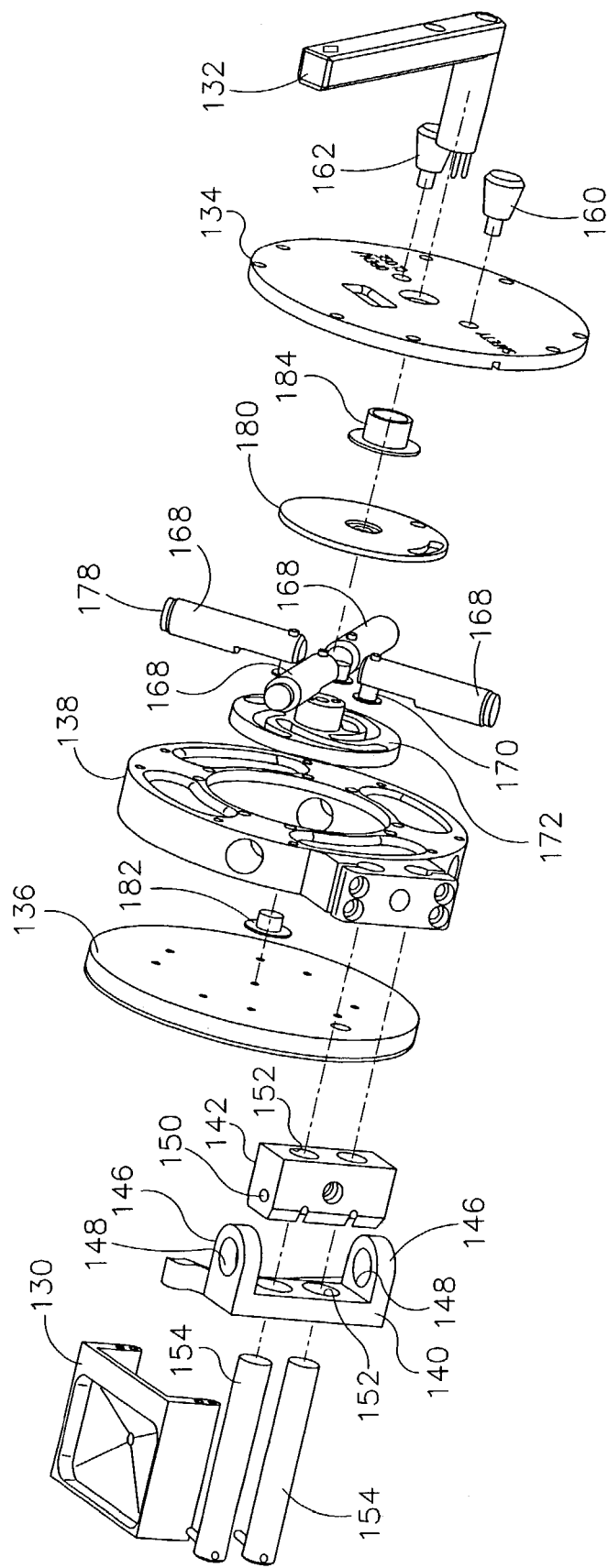
FIG. 12 is an exploded view of the door of the apparatus of FIG. 1.

Details of the door assembly 40 are shown in FIGS. 10–16. An inner surface of the door 40 includes a washbasin 130 that acts as a liquid capture well (FIGS. 11 and 12). The washbasin 130 may be a metal block defining an open center, wherein the open center is in fluid communication with the interior portion of the housing. It will be appreciated that the fluid path between the washbasin and the housing may be sealed so as to isolate the internal pressure and temperature of the housing from ambient pressure and temperature.

Figure 10:
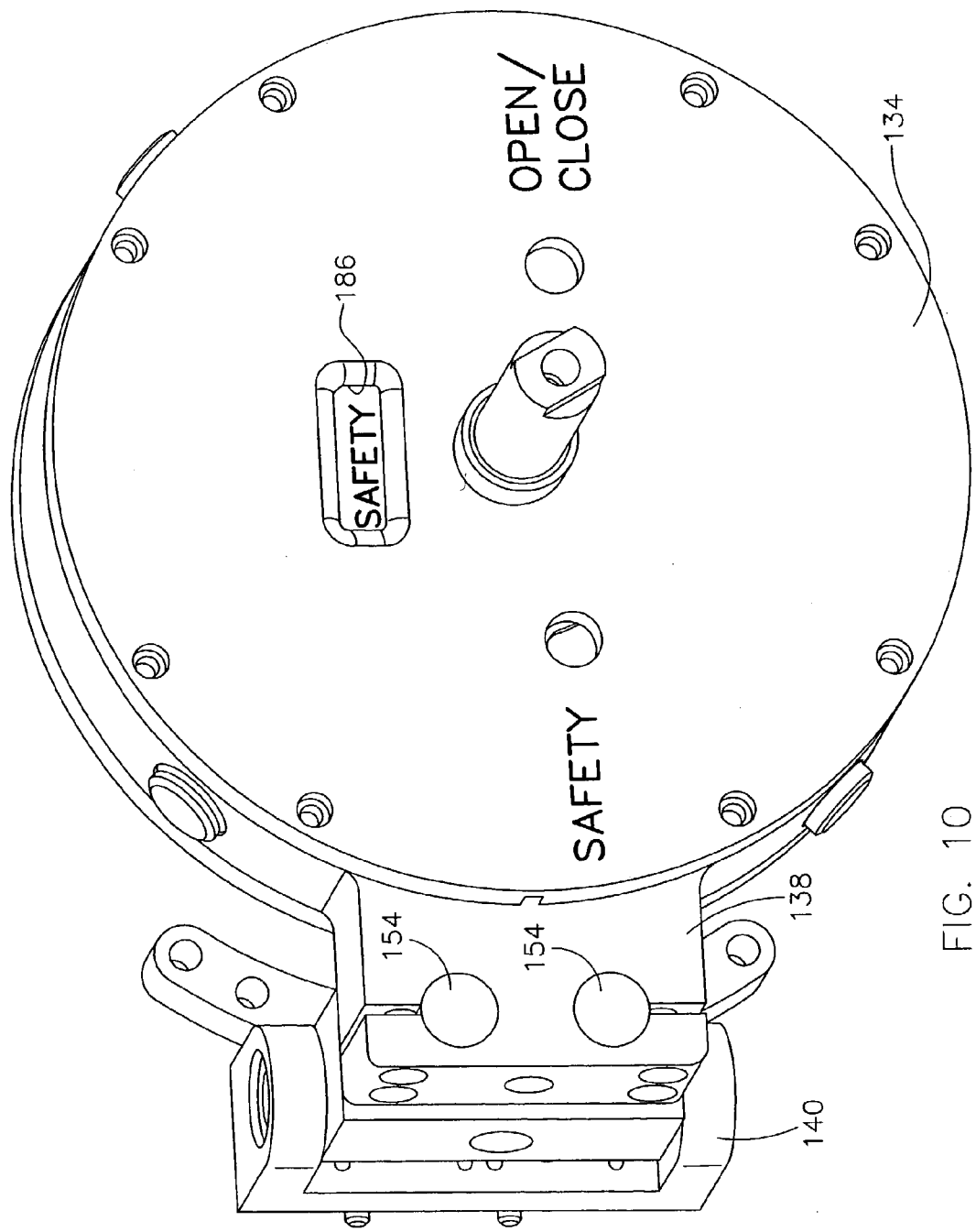
FIG. 10 is a front perspective of the door of the apparatus of FIG. 1 with parts removed to show detail.
Figure 14:
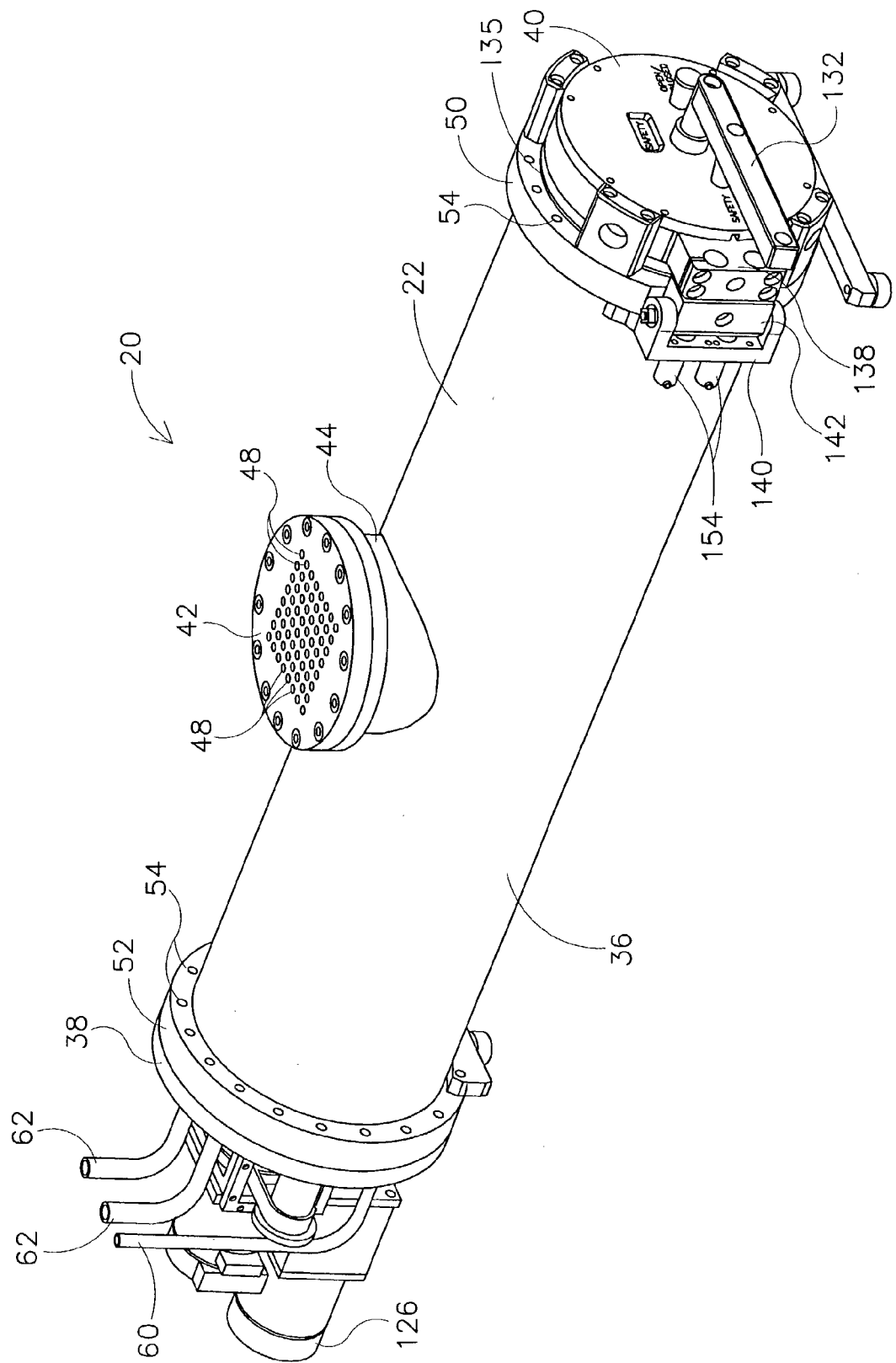
FIG. 14 is a perspective of the apparatus of FIG. 1 with the door in a safety position.
Figure 15:
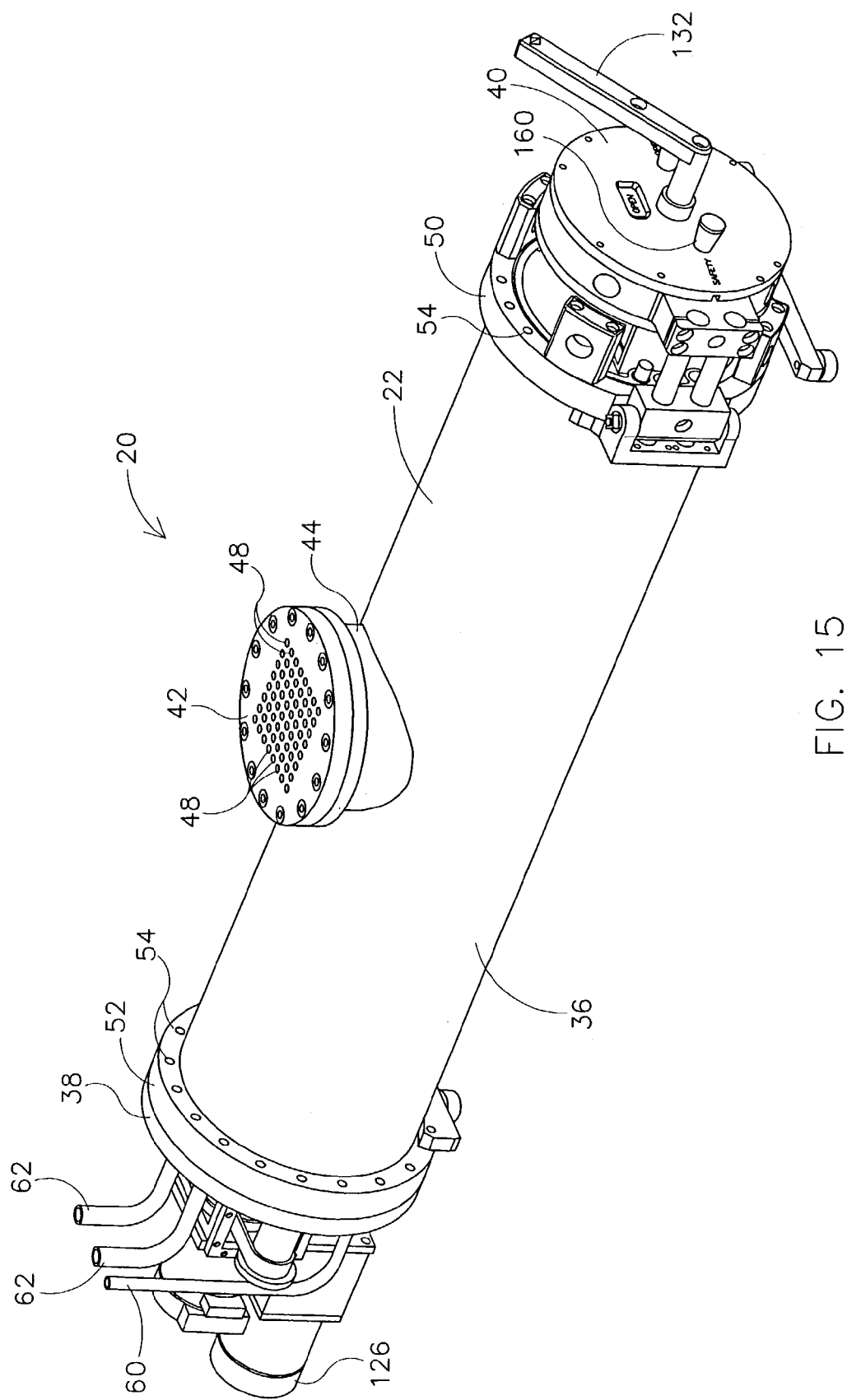
FIG. 15 is a perspective of the apparatus of FIG. 1 with the door moved from its safety position to an open position prior to pivoting the door away from the reaction chamber.
Figure 16:
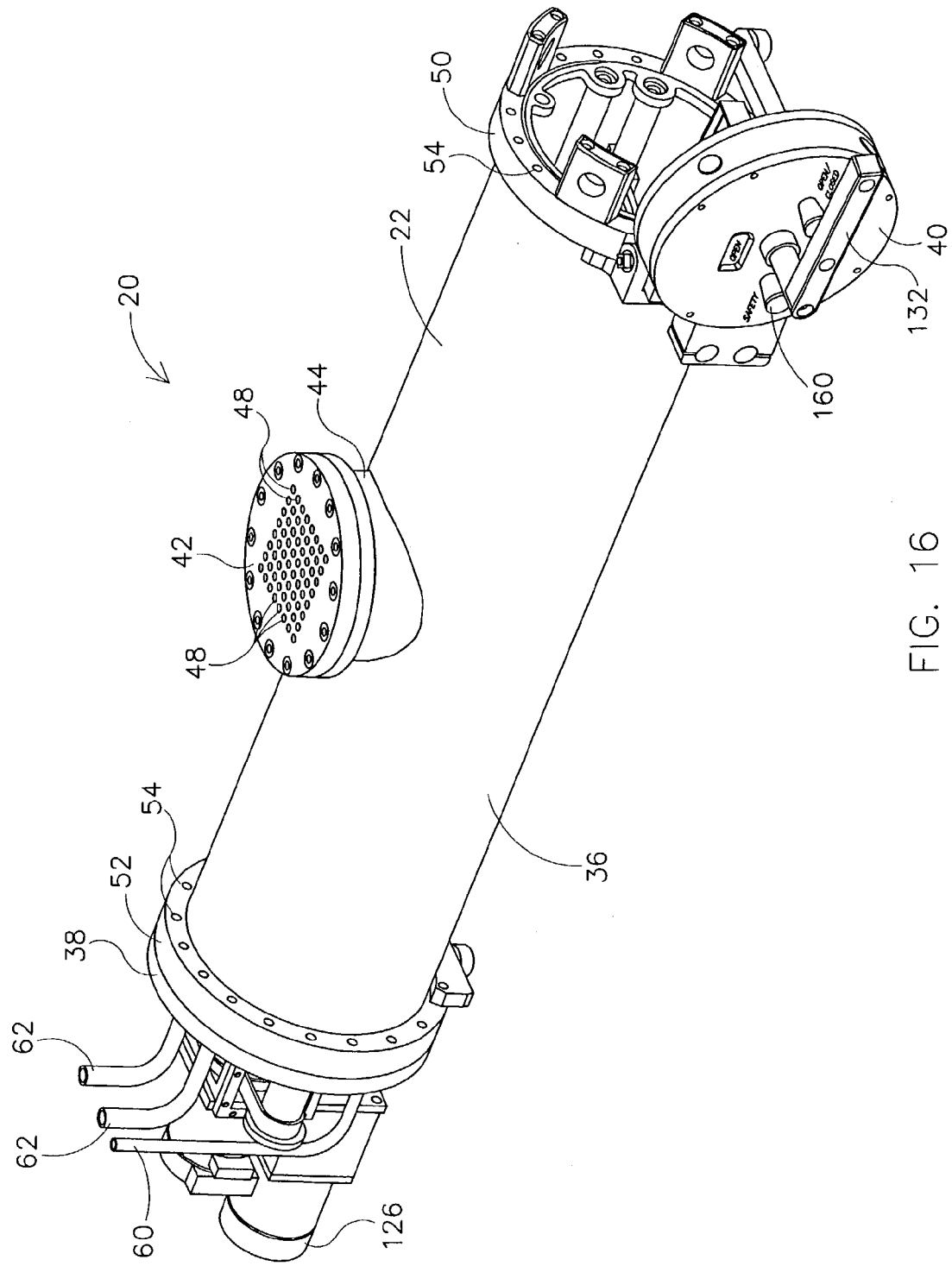
FIG. 16 is a perspective of the apparatus of FIG. 1 with the door rotated about its hinge in an open position.

An outer surface of the door 40 includes a handle 132 for moving the door between its closed/locked position (FIG. 1), closed/safety position (FIG. 14), and open position (FIG. 15). The door 40 includes a front cover 134, back cover 136, and slide block 138 interposed therebetween (FIG. 12). The door 40 is pivotably mounted on a pivot assembly connected to end ring 50 which is welded to the housing 36 (FIGS. 1 and 10). The pivot assembly includes a hinge member 140 mounted on the ring 50 and a pivot member 142. The hinge member 140 includes two arms 146 each having an aligned opening 148 for receiving a hinge pin (not shown) therethrough (FIGS. 10 and 12). The arms 146 are spaced apart to receive the pivot member 142 which has an opening 150 extending longitudinally therethrough and aligned with the openings 148 in the arms 146 of the hinge member 140 for receiving a hinge mechanism (e.g., bearing and shoulder bolt or hinge pin). The pivot member 142 is thus pivotably mounted within the hinge member 140. The hinge member 140 and pivot member 142 each further include two aligned transverse openings 152 for slidably receiving two door rods 154. The rods 154 extend through to the slider block 138 which is fixedly attached to the rods. When the door 40 is in its closed/locked position the slider block 138 is positioned generally adjacent to the hinge assembly and the door is held tightly against the housing ring 50 to create a sealed chamber 22 (FIG. 1). When the door 40 is in its safety position, the door is spaced from the pivot assembly to create a small gap 135 therebetween from which pressure can be safely vented from the chamber (FIG. 14). Once the handle 132 is moved to its open position, the door is pulled longitudinally away from the reaction chamber (FIG. 15). The door 40 can then be pivoted about the hinge member 140 to its open position to provide access to remove the sample tray 24 and plates 26 (FIG. 16).

The door assembly 40 further includes a safety spring loaded pin 160 and an open/close spring loaded pin 162 (FIGS. 1 and 12). The pins 160, 162 are pulled before turning the handle to allow movement of a cam and locking pins (described below). In order to open the door 40 of the sealed chamber 22, the open/close pin 162 is pulled and the handle 132 is first turned to the safety position. After the chamber is vented and pressure is released, the safety pin 160 is pulled and the handle is turned from the safety position to the open/close position. Each pin 160, 162 is spring loaded so that after the handle 132 is turned, the pin is returned to its seated position.

Figure 13:
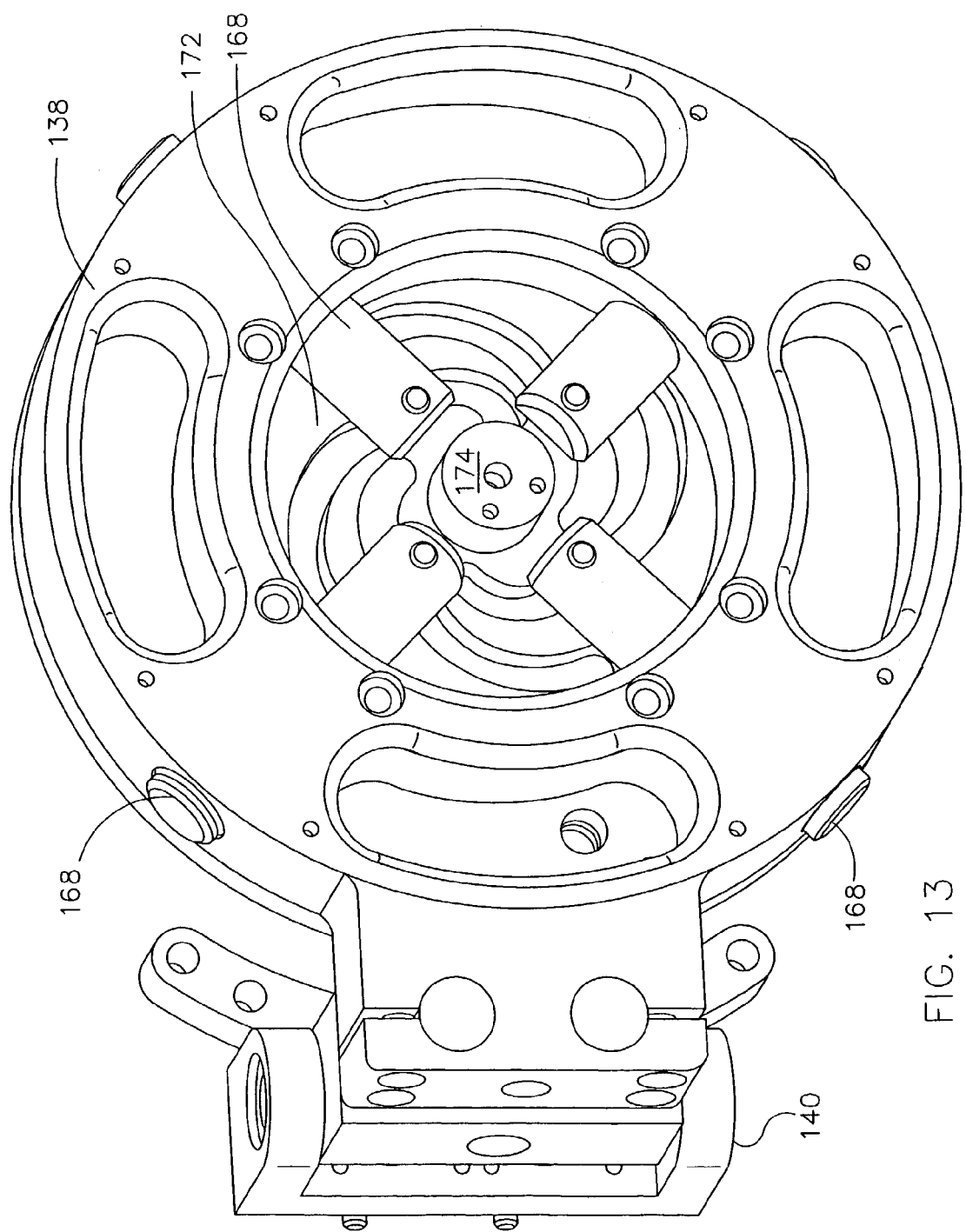
FIG. 13 is a front perspective of the door of FIG. 10 with parts removed to show detail.

Locking pins 168 are provided to securely lock the door 40 for pressurization of the chamber 22 (FIGS. 10, 11, and 12). The locking pins 168 each include a dowel pin and bearing 170 which ride in a cam 172 rotatably retained in the slide block 138 with bearings 182 and 184 (FIGS. 12 and 13). The locking pins 168 move axially into and out of door locks 176 located on an outer periphery of the door 40 (FIGS. 11 and 13). The cam 172 is moved by the door handle 132 (through bearings 182 and 184), which moves the locking pins 168 between a locked position, safety position, and open position. In the locked position, the locking pins 168 extend through the slide block 138 and are retained within the aligned openings in the door locks 176. In the safety position, the locking pins 168 are moved radially inwardly (relative to a longitudinal axis of the reaction chamber) to allow the door to open slightly. The locking pins 168 are each formed with a reduced diameter (e.g., stepped down or chamfered diameter) 178 which allows the door 40 to be moved longitudinally away from the housing 36 to vent the chamber 22. In the open position, the locking pins 168 are moved further radially inward so that they do not extend from the slider block 138 and the door is free to open. The locking pins 168 may be formed from heat treated 17-4 PH stainless steel, for example.

The door assembly 40 further includes a position identifier on rotatable plate 180 (FIGS. 10 and 12). The plate 180 includes a label for each door position (open, closed, safety). The front cover 134 includes a window 186 through which one of the labels corresponding to a position of the door can be seen. The plate 80 rotates with movement of the handle 132.

The door handle 132 and components coupling the handle to the door assembly may be configured such that the door cannot be opened when there is an internal pressure above a specified limit (e.g., 5 psi) for safety purposes.

The apparatus 20 may be enclosed in an enclosure such as a dry box (not shown). Installation of the apparatus in a dry box may allow the apparatus to be used with chemicals or reactant components classified as hazardous or non-hazardous or water/oxygen sensitive chemicals, as the dry box may isolate the apparatus from the surrounding environment. The dry box may also include a pressure relief mechanism or valve such as a conventional burst disk to permit venting of the interior of the dry box to ambient should the internal pressure of the dry box exceed predetermined design limits.

The following provides an example of operation of the apparatus 20 described above. After sealing the reaction chamber 22, a charging agent may be introduced into the reaction chamber (FIGS. 1 and 3). In a preferred embodiment, the charging agent is a polymerizable gas that eventually becomes dissolved or absorbed into the respective samples comprising one or more libraries. The charging agent is introduced into the reaction chamber 22 through the inlet port of the end plate 38. The charging agent may be injected into the reaction chamber 22 such that homogenous mixing of the fluid takes place. The apparatus 20 may be configured to permit one or more charging agents to be introduced into the reaction chamber 22 simultaneously.

In the disclosed embodiment, the charging agent may be a gaseous monomer. More specifically, the charging agent may be ethylene gas introduced into the reaction chamber 22 under pressure. For instance, the gas may be introduced into the reaction chamber 22 at a pressure of approximately 60 psi. One of skill in the art will appreciate that other chemical components may be used as the charging agent, and that different pressure levels may be used. For example, the reaction chamber 48 may be pressurized to 1 psi, 5 psi, 10 psi, 50 psi, 100 psi, 200 psi, 500 psi, or 1000 psi.

The in-situ injection of chemical components into the reaction chamber 22 may take place at any point or under any conditions prior to, during the course of, or after the screening experiments. The process of in-situ injection may be computer controlled. For example, a computer can be programmed with software for controlling the sequence of the injections, as well as the timing for the injections.

The injection manifold 28 may be moved incrementally such that desired injectors of the injection manifold align with selected samples supported by the sample plates 26. It will be appreciated that the injection manifold 28 is activated using conventional techniques to cause one or more chemical components to be applied to two or more samples retained on the sample plate. The aforementioned process may be repeated until all desired sample plates 26 have been treated with one or more chemical components.

Data may be gathered from wells of the one or more arrays within the device by coupling appropriate electrical components, sensors, or probes to one or more samples supported by each sample support plate 26 via an electrical feed through. Electrical or optical feed through may be provided via the fluid transfer plate 42 or end plate 38, for example. Data characterizing thermal characteristics of reaction or material properties may be measured by coupling a thermister or thermocouple to the sample plate 26 at each of the sample wells 82 or to the individual samples themselves via the electrical feed through. Data characterizing chemical, physical, or material properties or the contents of wells within the arrays may be acquired similarly. The collection of data via the electrical feed through may be performed manually or by an appropriately programmed computer. After the data gathering process has been completed, the system may be evacuated, purged, and the process described herein repeated.

A computer system may be used to control the injection of components, monitoring of samples, or analysis of data. For example, injections of various components may be computer controlled such that they are performed over time based on pre-planned experimental design. The computer system may include a user interface which allows a user to specify temperature settings, movement of the injection manifold, components to inject, and pump settings, for example.

The following example illustrates the principles and advantages of the invention.

The reaction chamber was heated to 75° C. A 96 element library in an aluminum reactor block comprised of four zones of 24 wells was placed in the reactor. Each of the four zones contained 23 solutions of distinct metal precursor-ligand-Group 13 reagent combinations in toluene and one metal precursor-Group 13 reagent solution in toluene. In each of the four zones, a different Group 13 reagent was used. The stirrer was set in motion at 400 rpm. The chamber was closed, purged with a gaseous vinyl monomer such as ethylene or propylene and pressurized with said monomer to 80 psig. After priming the pumps with reactants, a single activator such as triphenylcarbenium tetrakis(pentafluorophenyl)borate (($Ph_3C)(B(C_6F_5)_4$)) or N,N-di(n-alkyl) anilinium tetrakis(pentafluorophenyl)borate, where each alkyl is independently $(CH_2)_nCH_3$ (n may be 13, 15 or 17), was added to the 96 wells of the library. Polymerizations were allowed to occur over a period of 60 minutes, during which time the monomer pressure was maintained at 80 psig. After the run time of 60 minutes, the reactor was vented and purged three times with nitrogen. The reactor door was opened and the reactor block removed to allow analysis of polymerization products.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. An apparatus for injection of one or more chemical components into a reaction chamber, comprising:

a reaction chamber for receiving one or more libraries in a fixed position relative to the chamber and configured to form a sealed enclosure and withstand a pressure of approximately 5 psig, each of the libraries comprising two or more samples; and an injection manifold located within the reaction chamber and selectively movable relative to the libraries, the injection manifold comprising a plurality of injectors and configured for receiving at least one fluid transfer line coupled to an external source for injection of one or more chemical components into the reaction chamber with the reaction chamber pressurized wherein said plurality of injectors are configured such that at least two of said injectors are operable to apply said one or more chemical components simultaneously to respective samples.

2. The apparatus of claim 1 further comprising a stirring system for agitating the samples.

3. The apparatus of claim 2 wherein the stirring system comprises magnetic stirrers.

4. The apparatus of claim 1 further comprising a heating system for heating the samples.

5. The apparatus of claim 4 wherein the heating system is configured to heat the samples to at least 50° C.

6. The apparatus of claim 1 wherein the reaction chamber further comprises at least one inlet port for receiving a charging agent.

7. The apparatus of claim 1 wherein the sealed reaction chamber is configured to withstand a pressure of approximately 60 psig.

8. The apparatus of claim 1 wherein the sealed reaction chamber is configured to withstand a pressure of approximately 200 psig.

9. The apparatus of claim 1 wherein said plurality of injectors are configured to apply chemical components directly to the respective samples.

10. The apparatus of claim 1 wherein said at least one fluid transfer line is in fluid communication with at least one pump for delivering one or more of said chemical components.

11. The apparatus of claim 10 wherein the pump is a multi-channel pump.

12. The apparatus of claim 11 wherein the pump is a serial pump.

13. The apparatus of claim 11 wherein the pump is a parallel pump.

14. The apparatus of claim 1 wherein said samples are retained on a sample plate.

15. The apparatus of claim 14 wherein the sample plate is a microtiter plate.

16. The apparatus of claim 1 wherein said one or more libraries comprise one or more microtiter plates.

17. The apparatus of claim 1 wherein said one or more libraries comprise two or more materials on a common substrate.

18. The apparatus of claim 1 further comprising a drive system coupled to the injection manifold for moving the injection manifold within the reaction chamber.

19. The apparatus of claim 18 wherein the drive system comprises a motor coupled to a threaded rod, wherein rotation of the threaded rod causes linear movement of the injection manifold.

20. The apparatus of claim 1 wherein the libraries are supported on a sample support tray extending longitudinally within the housing and wherein the injection manifold is slidably movable on support rails extending longitudinally within the housing and generally parallel to the support tray.

21. The apparatus of claim 1 further comprising a sensor for sensing when the injection manifold is in a home position.

22. The apparatus of claim 21 wherein the sensor comprises a magnet attached to the injection manifold and a stationary gauss level sensor coupled to the reaction chamber.

23. The apparatus of claim 1 wherein said at least one fluid transfer line comprises a plurality of fluid transfer lines.

24. The apparatus of claim 23 further comprising a track for retaining said plurality of fluid transfer lines.

25. The apparatus of claim 24 wherein the track is fixedly mounted at one end to the reaction chamber and at the other end to the injection manifold for movement therewith.

26. An apparatus for injection of one or more chemical components into a reaction chamber, comprising:
a reaction chamber for receiving one or more libraries in a fixed position relative to the chamber and configured to form a sealed enclosure, each of the libraries comprising two or more samples;
an injection manifold located within the reaction chamber and selectively movable relative to the libraries, the injection manifold configured for receiving at least one fluid transfer line coupled to an external source for injection of one or more chemical components into the reaction chamber with the reaction chamber pressurized; and
a track for retaining said at least one fluid transfer line; the track comprising a flexible chain having at least one bending radius formed therein.

27. The apparatus of claim 1 wherein the reaction chamber is defined in part by a tubular member.

28. The apparatus of claim 27 further comprising an end plate attached to one end of the tubular member.

29. The apparatus of claim 28 wherein the end plate comprises at least one inlet port and at least one vent port.

30. The apparatus of claim 28 wherein a drive system for the injection manifold is coupled to the end plate.

31. The apparatus of claim 1 wherein the reaction chamber includes a fluid transfer plate having at least one opening for said at least one fluid transfer line to pass through.

32. The apparatus of claim 1 wherein the reaction chamber is defined by a cylindrical housing and a door.

33. An apparatus for injection of one or more chemical components into a reaction chamber, comprising: a reaction chamber for receiving one or more libraries in a fixed position relative to the chamber and configured to form a sealed enclosure and withstand a pressure of approximately 5 psig, each of the libraries comprising two or more samples; and an injection manifold located within the reaction chamber and selectively movable relative to the libraries, the injection manifold comprising a plurality of injectors and configured for receiving at least one fluid transfer line coupled to an external source for injection of one or more chemical components into the reaction chamber with the reaction chamber pressurized; wherein the reaction chamber is defined by a housing and a door, the door movable between an open position, a closed position, and a safety position.

34. The apparatus of claim 33 wherein the door is pivotably movable between the open position and the closed position.

35. The apparatus of claim 33 wherein the door is slidably movable between the closed position and the safety position to create a gap between the door and the housing for venting the pressurized reaction chamber.

36. The apparatus of claim 1 further comprising a heating system for heating the reaction chamber.

37. The apparatus of claim 1 wherein the fluid transfer lines include fiber optic sensors configured for sensing properties of at least one of the samples.

38. The apparatus of claim 1 wherein the fluid transfer lines include a sampling device configured for sampling at least one of the samples.

39. An apparatus for injection of one or more chemical components into a reaction chamber, comprising:
a reaction chamber for receiving one or more libraries and configured to form a sealed enclosure operable to withstand a pressure of approximately 5 psig, each of the libraries comprising two or more samples; and
an injection manifold comprising a plurality of injectors and configured for receiving at least one fluid transfer line coupled to a source for injection of one or more chemical components onto one or more of the samples with the reaction chamber pressurized, the injection manifold connected to a track fixedly mounted at one end to the reaction chamber, the injection manifold movably mounted within the reaction chamber to position said at least one fluid transfer line for injection of said one or more chemical components onto a selected sample.

40. The apparatus of claim 39 further comprising a stirring system for agitating the samples.

41. The apparatus of claim 40 wherein the stirring system comprises magnetic stirrers.

42. The apparatus of claim 39 further comprising a heating system for heating the samples.

43. The apparatus of claim 39 further comprising a heating system for heating the reaction chamber.

44. The apparatus of claim 39 wherein said plurality of injectors are configured to apply chemical components directly to the respective samples.

45. The apparatus of claim 39 wherein said at least one fluid transfer line is in fluid communication with at least one pump for delivering one or more of said chemical components.

46. The apparatus of claim 39 further comprising a drive system coupled to the injection manifold for moving the injection manifold within the reaction chamber.

47. The apparatus of claim 39 wherein the reaction chamber is defined by a cylindrical housing and a door.

48. The apparatus of claim 47 wherein the door is movable between an open position, a safety position, and a closed position.

49. The apparatus of claim 48 wherein the door is slidably movable between the closed position and the safety position to create a gap between the door and the housing for venting the pressurized reaction chamber.

50. The apparatus of claim 1 wherein the chemical component is a liquid.

* * * * *